(12) United States Patent
Asano et al.

(10) Patent No.: US 7,691,921 B2
(45) Date of Patent: Apr. 6, 2010

(54) CEMENT ADMIXTURE AND METHOD FOR PRODUCING THE SAME

(75) Inventors: Hideo Asano, Osaka (JP); Akihiko Yamashita, Ibaraki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1089 days.

(21) Appl. No.: 11/354,284

(22) Filed: Feb. 13, 2006

(65) Prior Publication Data

US 2006/0183820 A1 Aug. 17, 2006

(30) Foreign Application Priority Data

Feb. 14, 2005 (JP) ............... 2005-036895
Dec. 6, 2005 (JP) ............... 2005-373375

(51) Int. Cl.
*C04B 24/26* (2006.01)

(52) U.S. Cl. ............... 524/5; 526/76; 526/313; 526/332

(58) Field of Classification Search ............ 524/5; 526/76, 313, 332
See application file for complete search history.

(56) References Cited

U.S. PATENT DOCUMENTS

| | | | | |
|---|---|---|---|---|
| 4,872,995 A * | 10/1989 | Chen et al. | ............ | 210/699 |
| 5,180,498 A * | 1/1993 | Chen et al. | ............ | 210/697 |
| 6,166,112 A | 12/2000 | Hirata et al. | ............ | 524/5 |
| 6,462,110 B2 * | 10/2002 | Satoh et al. | ............ | 524/5 |
| 6,864,337 B2 * | 3/2005 | Yuasa et al. | ............ | 526/312 |
| 2001/0012864 A1 * | 8/2001 | Satoh et al. | ............ | 524/5 |
| 2002/0193547 A1 * | 12/2002 | Yuasa et al. | ............ | 526/312 |
| 2003/0008995 A1 | 1/2003 | Yamaguchi et al. | ............ | 526/266 |
| 2003/0106464 A1 | 6/2003 | Yamashita et al. | ............ | 106/728 |
| 2003/0125492 A1 | 7/2003 | Yamamoto et al. | ............ | 526/318.2 |
| 2003/0199616 A1 | 10/2003 | Yamashita et al. | ............ | 524/2 |

FOREIGN PATENT DOCUMENTS

| | | |
|---|---|---|
| JP | 11-71151 | 3/1999 |
| JP | 2001-180998 | 7/2001 |
| JP | 2003-212622 | 7/2003 |
| JP | 2004-182583 | 7/2004 |
| JP | 2004182583 A * | 7/2004 |
| JP | 2005-289844 | 10/2005 |
| JP | 2005289844 A * | 10/2005 |

* cited by examiner

*Primary Examiner*—David Wu
*Assistant Examiner*—Michael M Bernshteyn
(74) *Attorney, Agent, or Firm*—Occhiuti Rohlicek & Tsao LLP

(57) ABSTRACT

The present invention is to provide a method for producing a copolymer for a cement admixture, which enables to easily produce a blend of a plurality of copolymers with different monomer compositions in one polymerization operation, and is superior in water reducing performance and/or slump retention ability. Disclosed is a method for producing a copolymer for a cement admixture, which comprises a step of polymerizing monomer components comprising unsaturated polyalkylene glycol ether-based monomer (A) and unsaturated organic acid-based monomer (B), wherein the unsaturated polyalkylene glycol ether-based monomer (A) is added into a reactor in advance and the unsaturated organic acid-based monomer (B) is added thereto with an addition rate thereof changed at least one time.

4 Claims, 1 Drawing Sheet

CEMENT ADMIXTURE AND METHOD FOR PRODUCING THE SAME

BACKGROUND OF THE INVENTION

1. Field of the Invention

The present invention relates to a method for producing a copolymer for a cement admixture, a cement admixture containing the copolymer, and a cement composition containing the cement admixture. More specifically, the present invention relates to a method for producing a copolymer for a cement admixture which can be advantageously used in a cement composition such as cement paste, mortar and concrete, a cement admixture containing the copolymer and a cement composition containing such a cement admixture and widely used to build civil engineering and construction structures, etc.

2. Description of the Related Art

A cement admixture has been widely used as a water reducing agent for a cement composition such as cement paste, mortar and concrete, and is now an indispensable material to build civil engineering and construction structures, and the like from a cement composition. Such a cement admixture serves to improve strength and durability of hardened material by enhancing fluidity of a cement composition to reduce water content of a cement composition. Heretofore, naphthalene-based admixtures such as condensates of naphthalene sulfonic acid and formalin, melamine-based admixtures such as condensates of melamine sulfonic acid and formalin, polycarboxylic acid-based admixtures such as aqueous vinyl copolymers of a polyalkylene glycol monoester-based monomer and a (meth)acrylic acid-based monomer and/or a dicarboxylic acid-based monomer have been known. Among these water reducing agents, since a polycarboxylic acid-based polymer fulfills higher water reducing performance as compared with conventional water reducing agents such as naphthalene-based water reducing agent, in particular, a cement admixture containing this polycarboxylic acid-based polymer has had many actual results as a high performance AE water reducing agent.

In such a cement admixture, in addition to the water reducing performance for a cement composition, such a cement admixture is required that can impart good viscosity thereto, in consideration of workability at a field where a cement composition is used. In general, a cement admixture used as a water reducing agent exhibits superior water reducing performance by lowering viscosity of a cement composition. In addition to such water reducing performance, in order to make the work easy at a field where a cement composition is used, it is required to maintain a certain degree of viscosity at a construction site of civil engineering and construction structures, etc. With a cement admixture fulfilling such performance, work efficiency can be improved in building of civil engineering and construction structures, etc.

Aiming at the objects, various cement admixtures have been proposed. For example, JP-A-2004-182583 has disclosed a cement admixture essentially containing a ternary system of or a more multi-component system of a copolymer obtained by polymerizing monomer components comprising 3 or more kinds of monomers including an ethylene-based monomer (A) having a polyoxyalkylene group, an unsaturated organic acid-based monomer (B) and other unsaturated monomers (C), wherein molar ratios of an ethylene-based monomer (A) having a polyoxyalkylene group and other unsaturated monomers (C) in the copolymer are changed during the polymerization. Also, JP-A-2001-180998 has disclosed a binary or a ternary system of cement admixture which can fulfill superior dispersibility and fluidity. The cement admixture disclosed therein is a concrete admixture containing a copolymer mixture obtained by copolymerizing at least one monomer (A) represented by the general formula (a):

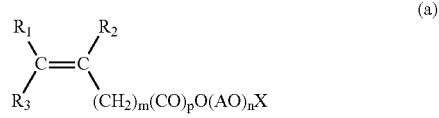

(wherein $R_1$ and $R_2$ represents a hydrogen atom or a methyl group; m is in the range of 0 to 2; $R_3$ represents a hydrogen atom or —COO(AO)$_n$X; p is 0 or 1; AO represents an oxyalkylene group with carbon atoms of 2 to 4 or an oxystyrene group; n is in the range of 2 to 300; and X represents a hydrogen atom or an alkyl group with carbon atoms of 1 to 18), and at least one monomer (B) represented by the general formula (b):

(wherein $R_4$ to $R_6$ represent a hydrogen atom, a methyl group or $(CH_2)_{m1}COOM_2$, wherein $(CH_2)_{m1}COOM_2$ may form an anhydride together with $COOM_1$ or another $(CH_2)_{m1}COOM_2$, provided that $M_1$ and $M_2$ of these groups are not present; $M_1$ and $M_2$ represent a hydrogen atom, an alkali metal, an alkaline earth metal, an ammonium group, an alkylammonium group or a substituted alkylammonium group; and m1 is in the range of 0 to 2), wherein the molar ratio of the monomers (A) and (B), (A)/(B) ratio, is changed at least one time during the reaction.

Furthermore, for the purpose to enhance performance of such a cement admixture, it is necessary that raw materials to be used should be severely controlled. For example, JP-A-11-71151 has disclosed a method for producing polycarboxylic acid for a cement admixture obtained by subjecting polyalkylene glycol having a peroxide value of not higher than 0.7 meq/kg to esterification reaction with (meth)acrylic acid to obtain polyalkylene glycol(meth)acrylate, and then copolymerizing the resultant polyalkylene glycol(meth)acrylate with (meth)acrylic acid.

SUMMARY OF THE INVENTION

Among the cement admixtures disclosed in the publications, the cement admixture disclosed in JP-A-2004-182583 has been developed intending to maintain fluidity of a cement composition and the like by improving slump retention ability, along with attaining a viscosity to provide easy work at a site where the cement composition and the like are used. The admixture, however, has not been in the level to sufficiently satisfy all of water reducing performance, slump retention ability and Viscosity.

Further, in paragraph [0021] of JP-A-2001-180998, there is such description as "the copolymer mixture is obtained by a production method which comprises a step of polymerizing with a molar ratio (A)/(B) changed at least one time, and specifically, dropping of a monomer (B) is started as the same time of starting the drop of an aqueous solution of a monomer (A)", and actually in an Example, the cement admixture is produced by simultaneously dropping monomers (A) and (B). On this occasion, when an ester-based monomer wherein p is 1 in the formula (a) is used as the monomer (A), even if monomers (A) and (B) are dropped simultaneously, the copolymerization of these monomers proceeds efficiently, because monomers (A) and (B) have nearly the same levels of polymerizabilities or there is no extreme difference between both monomers. However, when an ether-based monomer wherein p is 0 in the formula (a) is used as the monomer (A), due to reactivity difference between both monomers in such a way as self-polymerizability of the monomer (A) is lower (the monomer (A) is difficult to be continuously incorporated in a copolymer) or homopolymerizability of the monomer (A) is lower, whereas homopolymerizability of a monomer (B) is higher, only the monomer (B) added is preferentially polymerized, or in some cases, only the monomer (B) is polymerized, resulting in decrease of reaction rate of the monomer (A). Namely, due to low copolymerizability of the monomer (A), there is a case that the copolymerization does not proceed efficiently. For example, in a case when the copolymerization is carried out using an isoprenol(3-methyl-3-butene-1-ol) alkylene oxide adduct as the monomer (A) and acrylic acid as the monomer (B), reaction rate of the monomer (A) becomes lower relative to reaction rate of the monomer (B), resulting in a low reaction rate as a whole.

Therefore, the present invention has been made in consideration of the above circumstances, and it is an object of the present invention to provide a copolymer for a cement admixture superior in water reducing performance and/or slump retention ability, a method for producing the copolymer, a cement admixture containing the copolymer and a cement composition containing the cement admixture, wherein a copolymer with more uniform monomer composition or a blend of a plurality of copolymers with different monomer compositions can easily be produced by one polymerization operation, as well as monomer composition ratio or blend ratio of copolymers can easily be controlled.

Another object of the present invention is to provide a copolymer with superior water reducing performance and a cement admixture containing the copolymer.

Further another object of the present invention is to provide a cement admixture exerting the maximum cement dispersing performance by specifying raw material to be used in producing a copolymer.

The present inventors have comprehensively studied on a method for producing a copolymer by polymerizing an ether-based monomer and an unsaturated carboxylic acid-based monomer to attain the objects, to find that by adding an ether-based monomer with low reactivity into a reactor in advance and subsequently adding thereto an unsaturated carboxylic acid-based monomer with high reactivity and subjecting to a polymerization while an addition rate of the monomer with high reactivity is varied stepwise, a copolymer with more uniform monomer composition or a blend of a plurality of copolymers with different monomer compositions can easily be produced by one polymerization operation, and that a mixture of such polymers becomes superior in slump retention ability or water reducing performance by making the addition rate at the later stage faster or lower by varying the rate between before and after each addition stage. The present inventors have also found that in an average monomer composition of a mixture of copolymers as a whole, when the addition rate of a monomer (B) is made slower at the later step, a copolymer with more uniform monomer composition in a mixture can be produced, and this copolymer shows especially superior water reducing performance due to having a single monomer composition, while when the addition rate of a monomer (B) is made faster at the later stage, a blend of copolymers with moderately different monomer composition ratio in a mixture can be produced and this copolymer blend shows especially superior slump retention ability due to the different monomer composition. In particular, the present inventors have also found that the former copolymer can fulfill more superior water reducing performance compared with a polycarboxylic acid-based copolymer conventionally known to have superior water reducing performance.

In addition to the above knowledge, the present inventors also have comprehensively studied on producing a copolymer to be used for a cement admixture, to pay attention on a (meth)acrylic acid-based monomer among monomer components used in producing a copolymer, and found that by suppressing a content of (meth)acrylic acid dimer contained in the monomer, cement dispersing performance of a cement admixture obtained is significantly improved.

Based on the knowledge, the present invention has been completed.

Specifically, the object can be attained by a method for producing a copolymer for a cement admixture, which comprises a step of polymerizing monomer components comprising at least one unsaturated polyalkylene glycol ether-based monomer (A) represented by the following formula (1):

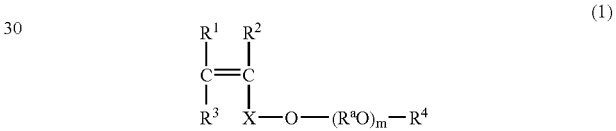

wherein $R^1$, $R^2$ and $R^3$ independently represent a hydrogen atom or a methyl group; $R^4$ represents a hydrogen atom or a hydrocarbon group with carbon atoms of 1 to 20; $R^a$ represents an alkylene group with carbon atoms of 2 to 18, provided that if m is 2 or more, each of oxyalkylene groups represented by $R^aO$ may be the same or different from each other; m represents an average addition mole number of oxyalkylene groups represented by $R^aO$ and is in the range of 1 to 300; and X represents a bivalent alkylene group with carbon atoms of 1 to 5, or when a group represented by $R^1R^3C=CR^2-$ is a vinyl group, X represents a bond; and at least one unsaturated organic acid-based monomer (B) represented by the following formula (2):

wherein $R^7$, $R^8$ and $R^9$ independently represent a hydrogen atom, a methyl group or $-(CH_2)_zCOOM^2$, wherein $-(CH_2)_zCOOM^2$ may form an anhydride together with $-COOM^1$ or another $-(CH_2)_zCOOM^2$, in which case $M^1$ or $M^2$ is not present, and Z is in the range of 0 to 2; and $M^1$ and $M^2$ independently represent a hydrogen atom, a metal atom, an ammonium group or an organic amine group; wherein the unsaturated polyalkylene glycol ether-based monomer (A) is added into a reactor in advance and the unsaturated organic acid-based monomer (B) is added thereto with an addition rate thereof changed at least one time.

The another object can be attained by a cement admixture which comprises a copolymer of at least one unsaturated polyalkylene glycol ether-based monomer (A) represented by the formula (1) with at least one unsaturated organic acid-based monomer (B) represented by the formula (2), wherein the addition amount of the cement admixture required for attaining a flow value of 250±5 mm by a mortar test method (X), as reduced to a solid content, is below 93% by weight based on an addition amount of a polycarboxylic acid-based copolymer (Y), as reduced to a solid content.

The further another object can be attained by a cement admixture which comprises a copolymer obtained by polymerizing monomer components comprising at least one unsaturated polyalkylene glycol ether-based monomer (A) represented by the formula (1) and (meth)acrylic acid-based monomer as a monomer (B), wherein a content of a (meth)acrylic acid dimer in the (meth)acrylic acid-based monomer used as the monomer (B) is not higher than 5% by weight, based on the (meth)acrylic acid-based monomer.

According to the present invention, since a copolymer with more uniform monomer composition or a blend of a plurality of copolymers with different monomer compositions can be produced by one polymerization operation without any complicated steps, it is not necessary to mix copolymers after separately producing to produce a copolymer blend, and thus production steps can be considerably simplified. In addition, by using such a copolymer blend as a cement admixture, the cement admixture superior in water reducing performance and/or slump retention ability can be produced. Furthermore, according to the present invention, by using a (meth)acrylic acid-based monomer with a content of (meth)acrylic acid dimer not higher than 5% by weight as a monomer component, the cement admixture containing the copolymer thus obtained can exhibit superior cement dispersing performance. In particular, since the copolymer according to the present invention can fulfill more superior water reducing performance as compared with a conventional polycarboxylic acid-based copolymer, it can be advantageously used as a high performance AE water reducing agent.

The cement admixture according to the present invention can enhance water reducing performance of a cement composition such as cement paste, mortar and concrete, make strength or durability of hardened material superior, retain fluidity by enhancing slump retention ability of a cement composition, and provide a viscosity to make the work easy at a site where the cement is used. Therefore, by using the cement admixture according to the present invention, work efficiency and the like can be improved in building civil engineering and construction structures and the like superior in fundamental performance.

The above and other objects, features and advantages of the present invention will become clear from the following description of the preferred embodiments and illustrated in the attached drawings.

BRIEF DESCRIPTION OF DRAWING(S)

DETAILED DESCRIPTION OF THE PREFERRED EMBODIMENT(S)

Figure 1:
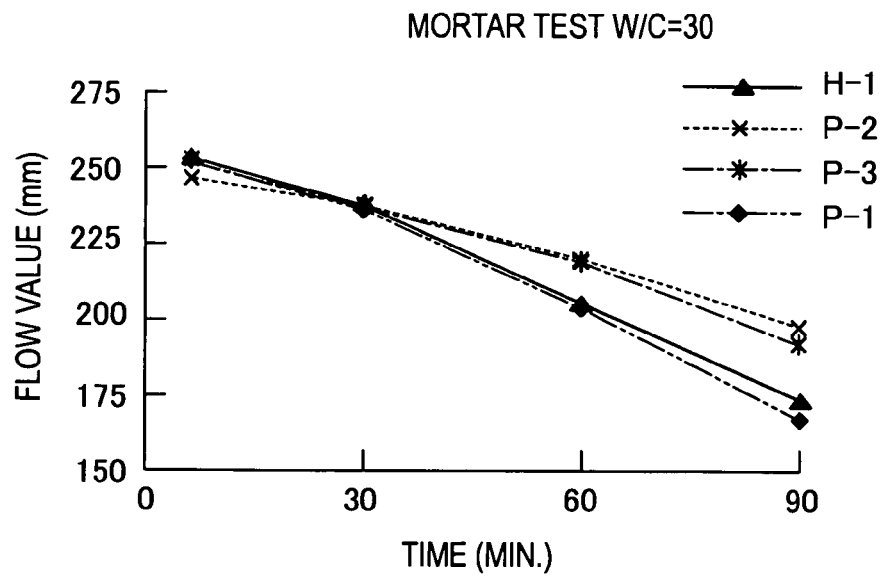
FIG. 1 is a graph showing mortar flow values measured in the mortar test in Example 4, using copolymers P-1 to P-3 according to the present invention and a copolymer for comparison H-1.

The present invention provides a method for producing a copolymer for a cement admixture, which comprises a step of polymerizing monomer components comprising at least one unsaturated polyalkylene glycol ether-based monomer (A) represented by the following formula (1) (hereinafter, also referred to as simply "monomer (A)"):

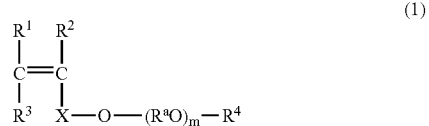

and at least one unsaturated organic acid-based monomer (B) represented by the following formula (2) (hereinafter, also referred to as simply "monomer (B)"):

wherein the unsaturated polyalkylene glycol ether-based monomer (A) is added into a reactor in advance and the unsaturated organic acid-based monomer (B) is added thereto with an addition rate thereof changed at least one time. This method is based on utilization of reactivity difference between an unsaturated polyalkylene glycol ether-based monomer (A) and an unsaturated organic acid-based monomer (B), where polymerization of these monomers (A) and (B) is carried out by collectively adding the unsaturated polyalkylene glycol ether-based monomer (A) with low reactivity into a reactor in advance prior to the polymerization with the monomer (B) and then adding the unsaturated organic acid-based monomer (B) with higher reactivity into the monomer (A) while an addition rate thereof is changed at least one time. According to such a polymerization method, a copolymer with more uniform monomer composition (with less variation in monomer composition) or a blend of two or more kinds of copolymers can be produced by one polymerization operation by varying the addition rate. By appropriately adjusting structure (monomer composition) of the copolymer or blend ratio of copolymers, a cement admixture containing the blend can sufficiently fulfill desired action effects (for example, water reducing performance and/or slump retention ability). On this occasion, the addition rate of the monomer (B) may be varied by any way of continuously or stepwise. However, since stepwise variation is easy in adjustment of the addition rate without requiring a special equipment as well as in adjustment of structure (monomer composition) of a polymer produced, production of a cement admixture having desired action effects (for example, water reducing performance and/or slump retention ability) becomes easy.

The present invention will be explained in more detail below.

The method for producing a copolymer according to the present invention comprises copolymerizing at least two kinds of monomer components including the monomer (A) and the monomer (B) to produce a copolymer. In this case, each of the monomers (A) and (B) may be used singly or as in a mixed form of two or more members. In addition to the monomers (A) and (B), a third unsaturated monomer (C) may be used, as described in detail below, and in this case, the third unsaturated monomer (C) may be used singly or as in a mixed form of two or more members.

The copolymer according to the present invention contains at least two kinds of monomer components including the monomer (A) and the monomer (B). The monomer (A) serves to exhibit dispersibility in a cement composition by hydrophilicity and steric repulsion of the polyoxyalkylene group thereof, whereas the monomer (B) serves to induce adsorption of the copolymer to cement particles or enhance hydrophilicity of the copolymer. In the present invention, by collectively adding the monomer (A) in advance, and then adding the monomer (B) into the monomer (A) while an addition rate of the monomer (B) is changed at least one time, and then copolymerizing these monomers, a copolymer with different composition ratios of the monomers (A) and (B) can be formed, and a blend of copolymers can be produced, in which dispersibility in a cement composition by the monomer (A) and adsorption ability of a copolymer to cement particles or hydrophilicity of the copolymer by the monomer (B) can be appropriately adjusted so as to attain the desired effects. By this method, a cement admixture with superior water reducing performance and/or slump retention ability can be obtained, as described in detail below.

The production method of the present invention is characterized in that an addition rate of the monomer (B) into the monomer (A) added in advance is changed at least one time. In this connection, as used herein, the phrase "an unsaturated polyalkylene glycol ether-based monomer (A) is added into a reactor in advance" means that a monomer (A) is initially added in advance into a reactor in the whole amount. Further, the term "initially" as used herein means until just before starting the copolymerization with the monomer (B), preferably until before the addition of the monomer (B), and more preferably until before the addition of the monomer (B) and a polymerization initiator. Number of times to change the addition rate is not especially limited and can be properly selected depending on desired characteristics (degree of importance of water reducing performance or slump retention ability) of a cement admixture to be produced or workability. It is preferably in the range of 1 to 10 times, more preferably 1 to 5 times, further more preferably 1 to 3 times, and most preferably 1 to 2 times. On this occasion, if the addition rate is changed 11 or more times, no improvement in characteristics corresponding to increase in the number of time can be expected, and on the contrary, workability of polymerization operation may become complicated. In this connection, when the addition rate of the monomer (B) is changed stepwise in the present invention, addition of the monomer (B) in each step, in which the monomer is added at a constant rate, may be performed in any way of continuously or stepwise or in a combined way of continuously and stepwise. The monomer (B) is preferably added continuously to the monomer (A) to avoid a risk that only the monomer (B) is consumed in the polymerization. As for a method for continuous addition, for example, a method of dropping continuously and the like may be included. As for a method for stepwise addition, for example, a method of addition by dividing in a several portions may be included.

In the present invention, the addition rate of the monomer (B) may be changed in any way of continuously or stepwise or by combination of continuously and stepwise. The addition rate is preferably changed stepwise, because of no need of special equipment, easy adjustment of the addition rate and easy adjustment of structure of a polymer produced. As used herein, the phrase "the addition rate is changed stepwise" means the addition amount, namely the addition rate, of the monomer (B) at a specified step is nearly constant, and on this occasion, variation of the addition amount/addition rate of the monomer (B) at a specified step may be adjusted within the range of ±15%, more preferably ±10%, and most preferably ±5%, of the desired addition amount/addition rate. A variation pattern of the addition rate of the monomer (B) may be any way of increasing or decreasing, or the addition rate may be a combination of increase and decrease (for example, alternative change of the addition rate between increase and decrease) in one polymerization step. By making the addition rate faster or slower stepwise or continuously, various performances (for example, improvement of water reducing performance or slump retention ability) of a copolymer produced for the use as a cement admixture can be attained. What performance among water reducing performance, slump retention ability and the like is preferentially improved depends on kind and amount of the monomers (A) and (B), and further kind and amount of the third unsaturated monomer (C), if used. However, it is considered as, but by no means limited to the following inference. To improve water reducing performance, in average monomer composition ratio of a mixture of copolymers as a whole, it is important to make monomer composition ratio in a mixture produced more uniform (less variation). The monomer composition ratio in a mixture can be attained by changing the addition rate of the monomer (B) at least one time to make the addition rate either faster or slower. The monomer composition ratio is more likely attained when the addition rate before the change is faster than that after the change. This may be considered to occur, because if the monomer (B) with high polymerizability is added at a constant rate when the monomer (A) with low polymerizability becomes scarce at the middle or later stage of polymerization, a ratio of the monomer (B) in a copolymer composition newly formed increases, whereas if the monomer (B) is added initially in a high rate to the monomer (A) and added slowly at the later step, increase of the ratio of the monomer (B) in a copolymer composition newly formed at the later step of polymerization is suppressed. Accordingly, a copolymer with uniform monomer composition can be produced. For example, when the addition rate of the monomer (B) is changed in two stages in one polymerization step, by making the addition rate at the first half stage faster relative to the addition rate at the second half stage, a copolymer for a cement admixture with superior water reducing performance can be obtained. On the contrary, to improve slump retention ability, in average monomer composition ratio of a mixture of copolymers as a whole, it is important to properly vary monomer composition in a mixture formed (to make a blend of copolymers). The monomer composition ratio in a mixture can be attained by making the addition rate faster or slower by changing the addition rate of the monomer (B) at least one time. The monomer composition ratio is more likely attained when the addition rate after the change is faster than the addition rate before the change. This is considered to occur, because by adding the monomer (B) at a higher rate at the later stage, a copolymerization proceeds at the first half of polymerization under a state where the monomer (A) is rich, and a copolymerization proceeds at the second half of polymerization under a state where the monomer (B) is rich, and because polymerizability of the monomer (A) now under a further scarce state is low, a ratio of the monomer (B) increases in a copolymer composition newly formed, and thus a blend of copolymers with different monomer compositions can be produced. For example, when the addition rate of the monomer (B) is changed in two stages in one polymerization step, by making the addition rate at the second half stage faster relative to the addition rate at the first half stage, a copolymer for a cement admixture with superior slump retention ability can be obtained. In these cases, degree of changing the addition rate of the monomer (B) between two stages is not especially limited and can be appropriately selected depending on desired characteristics (in particular, improvement of water reducing performance or balance between water reducing performance and slump retention ability) of a cement admixture to be produced and copolymerizability of the monomers (A) and (B). In consideration of a variation in structure (monomer composition) of a copolymer by changing the addition rate of the monomer (B) between the stages, it is preferably not lower than a certain specified ratio. Specifically, when the addition rate of the monomer (B) into the monomer (A) is changed continuously, and provided that the maximal value of the addition amount per time, that is, the addition rate (parts by weight/minute) of the monomer (B) is $V_{MAX}$ and the minimal value of that is $V_{MIN}$, a ratio of the maximal value and the minimal value, $V_{MAX}/V_{MIN}$, is preferably not less than 1.2 times, more preferably 1.25 to 30 times, further more preferably 1.5 to 15 times and most preferably 1.8 to 5 times. When the addition rate of the monomer (B) into the monomer (A) is changed stepwise, provided that the addition rate of the monomer (B) at the first half is $V_{B1}$ and the addition rate of the monomer (B) at the second half is $V_{B2}$, a ratio, $V_{B1}/V_{B2}$, before and after the change in the addition amount of the monomer (B), is preferably not less than 1.2 times, more preferably 1.25 to 30 times, further preferably 1.5 to 15 times and most preferably 1.8 to 5 times. In this case, a ratio $V_{B1}/V_{B2}$ below 1.2 would provide too small change in the addition rate of the monomer (B) between two steps to significantly vary structure (monomer composition) of a copolymer. Accordingly, even if a copolymer obtained by such a method is used as a cement admixture, desired improvement of water reducing performance can not be attained and may require a higher addition amount of the cement admixture to attain the desired effects. In addition, when the addition rate of the monomer (B) is changed in two stages in one polymerization step, by making the addition rate at the second half stage faster relative to the addition rate at the first half stage, a copolymer with superior slump retention ability can be obtained. Degree of changing the addition rate of the monomer (B) between the stages in such a case is also not especially limited and can be appropriately selected depending on the desired characteristics (in particular, improvement of slump retention ability or balance between slump retention ability and water reducing performance) of a cement admixture to be produced and copolymerizability of the monomers (A) and (B). Preferably, a ratio ($V_{B2}/V_{B1}$) before and after the variation in the addition amount of the monomer (B) is not less than 1.2 times, more preferably 1.25 to 30 times, further preferably 1.5 to 15 times and most preferably 1.8 to 5 times. In this case, a ratio $V_{B2}/V_{B1}$ below 1.2 would provide, similarly as above, too small change in the addition amount of the monomer (B) between the stages to significantly vary structure (monomer composition) of a copolymer. Therefore, even if a copolymer obtained by such a method is used as a cement admixture, the desired improvement of slump retention ability can not be attained and workability may be worsened with time. In addition, in the present invention, even in an embodiment where the addition amount of the monomer (B) is changed in three or more stages in one polymerization step, a degree of change in the addition amount of the monomer (B) between the stages may be preferably within the range.

In the present invention, addition conditions of the monomer (B) are not especially limited so long as desired characteristics (water reducing performance and slump retention ability) can be obtained. For example, addition amount of the monomer (B) can be properly selected depending on the amount of the monomer (A) added in advance and desired characteristics. For example, when the monomer (B) is added in two stages, the addition rate of the monomer (B) at the stage of slower rate is preferably in the range of 0.1 to 20 parts by weight/hour, more preferably 0.5 to 5 parts by weight/hour, based on 100 parts by weight of the monomer (A). In such a case, the addition rate of the monomer (B) at the stage of faster rate is preferably in the range of 0.5 to 50 parts by weight/hour, more preferably 1 to 15 parts by weight/hour based, on 100 parts by weight of the monomer (A). Addition time of the monomer (B) can be properly selected depending on addition amounts of the monomers (A) and (B) or desired characteristics as a cement admixture. It is preferably in the range of 0.5 to 10 hours and more preferably 1 to 6 hours. Addition temperature of the monomer (B) may be similar to polymerization temperature as described in detail later. It is preferably in the range of 0 to 150° C., more preferably 30 to 100° C. and most preferably 40 to 80° C.

The unsaturated polyalkylene glycolether-based monomer (A) and the unsaturated organic acid-based monomer (B), and the third unsaturated monomer (C) which may be optionally added, as raw materials of the cement admixture of the present invention will be explained in detail below.

The unsaturated polyalkylene glycol ether-based monomer (A) according to the present invention is a compound represented by the formula (1). Namely, the unsaturated polyalkylene glycol ether-based monomer (A) in the present invention has a polymerizable ethylene group and a polyalkylene glycol chain, and an adduct of alcohol polyalkylene glycol having an ethylene group may be preferable. As the monomer (A), any compound may be suitably used, so long as it has a structure having an alcohol containing an ethylene group bonded with a polyalkylene glycol chain, and preferably a compound having an alkenyl group with carbon atoms not less than 5, preferably carbon atoms of 5, and 1 to 300 units of oxyalkylene group with carbon atoms of 2 to 18. Specifically, an adduct of vinyl alcohol with alkylene oxide, an adduct of (meth)allyl alcohol with alkylene oxide, an adduct of 3-butene-1-ol with alkylene oxide, an adduct of isoprenol(3-methyl-3-buten-1-ol) with alkylene oxide, an adduct of 3-methyl-2-buten-1-ol with alkylene oxide, an adduct of 2-methyl-3-buten-2-ol with alkylene oxide, an adduct of 2-methyl-2-buten-1-ol with alkylene oxide and an adduct of 2-methyl-3-buten-1-ol with alkylene oxide may be advantageously used. An adduct of isoprenol(3-methyl-3-buten-1-ol) with alkylene oxide having alkylene oxide added to 3-methyl-3-buten-1-ol may be more preferable and an adduct of isoprenol(3-methyl-3-buten-1-ol) with alkylene oxide having 1 to 300 units of alkylene oxide added to 3-methyl-3-buten-1-ol may be especially preferable.

In the formula (1), $R^1$, $R^2$ and $R^3$ represent a hydrogen atom or a methyl group. $R^1$, $R^2$ and $R^3$ may be the same or different from each other. $R^4$ represents a hydrogen atom or a hydrocarbon group with carbon atoms of 1 to 20. In this connection, when $R^4$ has carbon atoms over 20, hydrohobic property of a cement admixture of the present invention becomes too strong to obtain good dispersibility. As the hydrocarbon group having carbon atoms of 1 to 20, for example, an aliphatic or alicyclic alkyl group having carbon atoms of 1 to 20, such as methyl, ethyl, n-propyl, isopropyl, n-butyl, isobutyl, sec-butyl, tert-butyl, cyclopropyl, cyclobutyl, cyclopentyl and cyclohexyl groups; an aryl group having carbon atoms of 6 to 20, such as phenyl, naphthyl, anthryl and phenanthryl groups; an aryl group substituted with an alkyl group, such as o-, m- or p-tolyl group, 2,3- or 2,4-xylyl group and mesityl group; an aryl group substituted with an (alkyl)phenyl group, such as biphenylyl group; an alkyl group substituted with an aryl group, such as benzyl, phenethyl, benzhydryl and trityl group may be included. Among these, $R^4$ is preferably a saturated alkyl group or unsaturated alkyl group having carbon atoms of not more than 10, further preferably not more than 3 and especially preferably not more than 2. Namely, as $R^4$, a hydrogen atom, methyl, ethyl and vinyl group is especially preferable and a hydrogen atom and a methyl group are most preferable. Further, to express superior material separation-preventing performance or to entrain suitable amount of air into a cement composition, a hydrocarbon group with carbon atoms of 5 to 10 is preferable. In this case, the hydrocarbon group is preferably a saturated alkyl group or an unsaturated alkyl group. In addition, these alkyl groups may be any type of linear, branched or cyclic.

In the formula (1), X represents a bivalent alkylene group with carbon atoms of 1 to 5 or when a group represented by $R^1R^3C=CR-$ is a vinyl group ($CH_2=CH-$ group) (that is, $R^1$, $R^2$ and $R^3$ are hydrogen atoms), X represents a bond. Specifically, a carbon atom and an oxygen atom bonded to X are directly linked each other. As examples of the bivalent alkylene group having carbon atoms of 1 to 5, for example, methylene($-CH_2-$), ethylene($-CH_2CH_2-$), trimethylene($-CH_2CH_2CH_2-$), tetramethylene ($-CH_2CH_2CH_2CH_2-$) and propylene[$-CH(CH_3)CH_2-$] groups may be included. Among these, X is preferably methylene and ethylene, in particular ethylene is preferable.

In the formula (1), $R^a$ represents an alkylene group with carbon atoms of 2 to 18. In this case, the alkylene group may be any of linear or branched. In the formula (1), when m is 2 or more, each of oxyalkylene groups represented by $R^aO$ may be the same or different from each other. As the alkylene group having carbon atoms of 2 to 18, a linear alkylene group such as ethylene($-CH_2CH_2-$), trimethylene ($-CH_2CH_2CH_2-$), tetramethylene ($-CH_2CH_2CH_2CH_2-$), pentamethylene and hexamethylene group; and a branched alkylene group such as ethylidene [$-CH(CH_3)-$], propylene [$-CH(CH_3)CH_2-$], propylidene [$-CH(CH_3CH_2)-$] and isopropylidene [$-C(CH_3)_2-$] may be included. Namely, an oxyalkylene group represented by $-(R^aO)-$ is derived from an adduct of an alkylene oxide having carbon atoms of 2 to 18, and structure of such an alkylene oxide adduct is one formed by one or more kinds of alkylene oxides such as ethylene oxide, propylene oxide, butylene oxide, isobutylene oxide, 1-butene oxide and 2-butene oxide. Among these, adducts of ethylene oxide, propylene oxide, butylene oxide are preferable, and one with ethylene oxide as a major component is especially preferable. When an oxyalkylene group represented by $-(R^aO)-$ is mainly composed of ethylene oxide, a ratio of ethylene oxide occupied in the whole oxyalkylene groups is not especially limited. It is preferably in the range of 50 to 100% by mole, and more preferably 75 to 100% by mole.

In the formula (1), m represents an average addition mole number of oxyalkylene groups represented by $R^aO$ and is in the range of 1 to 300. When m is 2 or more, each of oxyalkylene groups represented by $R^aO$ may be the same or different from each other. The addition of an oxyalkylene group represented by $-R^aO-$ may be in any addition pattern of, for example, random addition, block addition or alternate addition.

The average addition mole number, m, of oxyalkylene groups represented by $R^aO$ is in the range of 1 to 300. When m is over 300, polymerizability of the monomer may be decreased. Preferable range of m is not less than 2, and also as average addition mole number of oxyethylene groups occupied in $-(R^aO)_m-$ is preferably not less than 2. When m is below 2 or the average addition mole number of oxyethylene groups is below 2, it may happen that hydrophilicity and steric hindrance sufficient for dispersing cement particles and the like can not be obtained, and thus superior fluidity cannot be obtained. To obtain superior fluidity, a range of m is preferably not less than 3 and not more than 280. More preferably it is not less than 5, further more preferably not less than 10 and especially preferably not less than 20. In addition, more preferably it is not more than 250 and especially preferably not more than 150. As average addition mole number of oxyethylene groups, it is preferably not less than 3 and not more than 280. In addition, more preferably it is not less than 10 and further preferably not less than 20. Further, it is more preferably not more than 250, further preferably not more than 200 and especially preferably not more than 150. As used herein, the phrase "average addition mole number" means an average value of mole number of oxyethylene groups added per one mole of a monomer. To obtain concrete with low viscosity, a range of m is preferably not less than 3 and not more than 100. More preferably, it is not less than 4 and not more than 50. Especially preferably, it is not less than 4 and not more than 30. Most preferably, it is not less than 5 and not more than 25. As the monomer (A) of the formula (1) having the polyoxyalkylene group, two or more kinds of monomers with different average addition mole numbers of polyoxyalkylene groups may be used in combination. As a suitable combination, for example, a combination of two kinds of monomers (A) with difference in m of not more than 10 (preferably not more than 5) and difference in m of not less than 10 (preferably difference in m is not less than 20), or a combination of 3 or more kinds of monomers (A) with difference in each average addition mole number m of not less than 10 (preferably difference in m not less than 20), and the like are included. Further, as a range of m for combined use, a combination of the monomer (A) with average addition mole number m in the range of 40 to 300 and the monomer (A) with a range of 1 to 40 (provided that difference in m is not less than 10 and preferably not less than 20); and a combination of the monomer (A) with average addition mole number m in the range of 20 to 300 and a monomer (A) with a range of 1 to 20 (provided that difference in m is not less than 10 and preferably not less than 20) are possible.

Therefore, examples of an unsaturated polyalkylene ether-based monomer (A) which can be used in the present invention may be any one described above and, for example, polyethylene glycol monovinyl ether, polyethylene glycol monoallyl ether, polyethylene glycol mono(2-methyl-2-propenyl)ether, polyethylene glycol mono(2-butenyl)ether, polyethylene glycol mono(3-methyl-3-butenyl)ether, polyethylene glycol mono(3-methyl-2-butenyl)ether, polyethylene glycol mono(2-methyl-3-butenyl)ether, polyethylene glycol mono(2-methyl-2-butenyl)ether, polyethylene glycol mono(1,1-dimethyl-2-propenyl)ether, polyethylenepolypropyleneglycol mono(3-methyl-3-butenyl)ether, methoxypolyethylene glycol mono(3-methyl-3-butenyl)ether, ethoxypolyethylene glycol mono(3-methyl-3-butenyl)ether, 1-propoxypolyethylene glycol mono(3-methyl-3-butenyl) ether, cyclohexyloxypolyethylene glycol mono(3-methyl-3-butenyl)ether, 1-octyloxypolyethylene glycol mono(3-methyl-3-butenyl)ether, nonylalkoxypolyethylene glycol mono (3-methyl-3-butenyl)ether, laurylalkoxypolyethylene glycol mono(3-methyl-3-butenyl)ether, stearylalkoxypolyethylene glycol mono(3-methyl-3-butenyl)ether, phenoxypolyethylene glycol mono(3-methyl-3-butenyl)ether, naphthoxypolyethylene glycol mono(3-methyl-3-butenyl)ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl)ether, ethoxypolyethylene glycol mono(2-methyl-2-propenyl)ether and phenoxypolyethylene glycol mono(2-methyl-2-propenyl)ether can suitably be used.

In the present invention, the monomer (A) may be used singly or in a mixed form of two or more kinds. When the monomer (A) is used in a mixed form of two or more kinds, composition ratio of each monomer can be properly selected corresponding to desired characteristics of a cement admixture to be produced and not especially limited. For example, a combination of monomers with different m values in the formula (1) can suitably be used. In this case, composition ratio of each monomer is not especially limited, and, for example, when monomers are used as a mixture form of two kinds, a composition ratio (weight ratio) of each monomer is preferably in the range of 99/1 to 1/99 and more preferably 80/20 to 20/80.

The unsaturated organic acid-based monomer (B) used in the present invention may be any monomer so long as it has a polymerizable unsaturated group and a group enabling to form carboxylic acid, and is a compound represented by the formula (2).

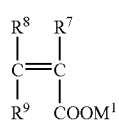

(2)

In the formula (2), $R^7$, $R^8$ and $R^9$ independently represent a hydrogen atom, a methyl group or $-(CH_2)_z COOM^2$, wherein $-(CH_2)_z COOM^2$ may form an anhydride together with $-COOM^1$ or another $-(CH_2)_z COOM^2$, provided that $M^1$ or $M^2$ is not present. $R^7$, $R^8$ and $R^9$ may be the same or different from each other. In the formula: $-(CH_2)_z COOM^2$, Z is in the range of 0 to 2. Each of $M^1$ and $M^2$ represents a hydrogen atom, a metal atom, an ammonium group or an organic amine group (an organic ammonium group). $M^1$ and $M^2$ may be the same or different from each other. As a metal atom in $M^1$ and $M^2$, monovalent metal atoms of, for example, alkali metal atoms such as lithium, sodium and potassium; bivalent metal atoms of, for example, alkaline earth metal atoms such as calcium and magnesium; trivalent metal atoms such as aluminum and iron can be advantageously used. Also, as an organic amine group, alkanolamine groups such as ethanol amine group, diethanol amine group and triethanol amine group; and triethyl amine group can be advantageously used. Further, an ammonium group may be included.

Among the monomer (B) used in the present invention, an unsaturated monocarboxylic acid-based monomer or an unsaturated dicarboxylic acid-based monomer may be preferably used and an unsaturated monocarboxylic acid-based monomer may be more preferably used.

Among the preferable monomers (B), as an unsaturated monocarboxylic acid-based monomer represented by the formula (2) wherein each of $R^7$, $R^8$ and $R^9$ is a hydrogen atom or a methyl group, acrylic acid, methacrylic acid and crotonic acid; and a monovalent metal salt, a bivalent metal salt, an ammonium salt and an organic amine salt (an organic ammonium salt) thereof can be advantageously used. Among these, in view of improvement of cement dispersing performance, (meth)acrylic acid-based monomer, namely, acrylic acid and methacrylic acid; and a monovalent metal salt, a bivalent metal salt, an ammonium salt and an organic amine salt thereof can be advantageously used as the monomer (B).

In addition, among the preferable monomers (B), an unsaturated dicarboxylic acid-based monomer in the formula (2) wherein one of $R^7$, $R^8$ and $R^9$ represents $-(CH_2)_z COOM^2$ and the others represent a hydrogen atom or a methyl group may be such a monomer that has one unsaturated group and two carboxylic acid formable groups in a molecule, and, for example, maleic acid, itaconic acid, citraconic acid and fumaric acid; and a monovalent metal salt, a bivalent metal salt, an ammonium salt and an organic amine salt thereof or anhydrides thereof can be advantageously used.

As the monomer (B), in addition to these, half esters of an unsaturated dicarboxylic acid-based monomer and an alcohol having carbon atoms of 1 to 22; half amides of unsaturated dicarboxylic acids and an amine having carbon atoms of 1 to 22; half esters of an unsaturated dicarboxylic acid-based monomer and a glycol having carbon atoms of 2 to 4; and half amides of maleamic acid and a glycol having carbon atoms of 2 to 4 can be used.

In the present invention, the monomer (B) may be used singly or in a mixed form of two or more kinds. When the monomer (B) is used in a mixed form of two or more kinds, composition ratio of each monomer can be appropriately selected corresponding to desired characteristics of a cement admixture to be produced and not especially limited. For example, such combinations are suitably used as an acrylic acid-based monomer and a methacrylic acid-based monomer; an acrylic acid-based monomer and a maleic acid-based or maleic anhydride-based monomer; and a methacrylic acid-based monomer and a maleic acid-based or maleic anhydride-based monomer. In these cases, composition ratio of each monomer is not especially limited, and, for example, when monomers are used as a mixture form of two kinds, a composition ratio (weight ratio) of each monomer is preferably in the range of 99/1 to 1/99, more preferably 95/5 to 5/95 and further more preferably 80/20 to 20/80. As described above, it is preferable that the unsaturated organic acid-based monomer (B) contains a (meth)acrylic acid-based monomer, in particular, it is preferable to contain an acrylic acid-based monomer. In this case, a ratio of an acrylic acid-based monomer is preferably not less than 50% by weight, based on the total weight of the monomers.

The copolymer relevant to the present invention can be produced by copolymerization of monomer components containing the monomer (A) and the monomer (B) as essential monomer components. A third unsaturated monomer (C) (hereinafter, referred to as simply "monomer (C)") may be further contained. The monomer (C) to be used herein is not especially limited and may include an alkyl(meth)acrylate such as methyl(meth)acrylate, ethyl(meth)acrylate, propyl(meth)acrylate and butyl(meth)acrylate; hydroxyethyl (meth)acrylate; an unsaturated sulfonic acid such as 2-methylpropane sulfonic acid acrylamide and styrene sulfonic acid; and monovalent metal salt, bivalent metal salt, ammonium salt and organic amine salt thereof; unsaturated amide such as (meth)acrylamide and (meth)acryl alkylamide; an unsaturated amino compound such as dimethylaminoethyl(meth) acrylate; vinyl esters such as vinyl acetate and vinyl propionate; and aromatic vinyl compounds such as styrene. The monomer (C) may be used singly or in a mixed form of two or more kinds. In particular, to improve slump retention ability, it is preferable to use an acrylate ester-based monomer such as hydroxyethyl acrylate as the monomer component.

A method for copolymerizing the monomers (A) and (B), along with the monomer (C), if necessary, is not especially limited and a well-known method for copolymerization can be used. Preferable embodiments of the method for copolymerizing the monomers (A) and (B) according to the present invention will be explained below.

As described above, in the present invention, an addition method of each the monomers (A) and (B) into a reactor in the copolymerization thereof is such a way that the monomer (A) is collectively added into a reactor in advance before starting the copolymerization, and then the monomer (B) is added. On this occasion, the monomer (B) is added into a reactor while the addition rate is changed at least one time. By adding, like this, the monomer (A) with low reactivity (polymerizability) in advance collectively and then adding the monomer (B) with high reactivity (polymerizability), the copolymerization of the monomers (A) and (B) can efficiently be performed. Also, by changing the addition rate of the monomer (B) at least one time during the polymerization step thereof, a polymer with more uniform monomer composition or a blend of two or more kinds of copolymers with different monomer compositions can be produced in one polymerization step. Further, by appropriately adjusting degree of change in the addition rate, a copolymer with different characteristics such as superior water reducing performance and/or superior slump retention ability can be obtained. Therefore, by properly changing the addition rate of the monomer (B), a copolymer for a cement admixture having desired characteristics can be produced in one polymerization step.

Timing of adding the monomer (C), when the monomer (C) is used, is not especially limited so long as the timing allows the monomer (C) to copolymerize with the monomers (A) and (B) efficiently to produce a desired blend of copolymers. The monomer (C) may be added into a reactor in advance together with the monomer (A); or may be added with the monomer (B) continuously or stepwise (on this occasion, there may be a period when the monomer (C) is not added); or may be added after completion of the addition of the monomer (B). Among these, preferably the monomer (C) is added dropwise.

A method for producing a copolymer according to the present invention comprises copolymerizing the monomer (A) and the monomer (B), along with the monomer (C), if necessary. On this occasion, a method for copolymerization is not especially limited and well-known methods such as solution polymerization and mass polymerization can be used. A copolymerization may be carried out in a batch system or a continuous system, and as a solvent to be used on this occasion, water; alcohols such as methyl alcohol, ethyl alcohol and isopropyl alcohol; aromatic or aliphatic hydrocarbons such as benzene, toluene, xylene, cyclohexane and n-hexane; ester compounds such as ethyl acetate; ketone compounds such as acetone and methyl ethyl ketone; cyclic ether compounds such as tetrahydrofuran and dioxane may be included. The solvents may be used singly or in a mixed form of two or more kinds. Among these solvents, it is preferable to use at least one member selected from the group consisting of water and lower alcohols having carbon atoms of 1 to 4. The use of water is especially preferable, because a solvent removal step can be omitted. Amount of the solvent to be used is not limited so long as the solvent can secure sufficient progress of copolymerization of the monomers (A) and (B) along with the monomer (C), if necessary. However, preferably the amount of the solvent to be used is adjusted so that total amount of the monomer components to be used in the copolymerization becomes not less than 30% by weight based on the total weight of raw materials containing other raw materials. More preferably, the amount of the solvent is adjusted so that total amount of the monomer components to be used in the copolymerization becomes 30 to 95% by weight, further more preferably 40 to 93% by weight, and most preferably 50 to 90% by weight, based on the total weight of raw materials containing other raw materials. On this occasion, the total amount of the monomer components to be used below 30% by weight would lower polymerization rate or lower productivity.

In the method for producing a copolymer according to the present invention, it is preferable to use a chain transfer agent in copolymerization and/or pH is adjusted at a value of not lower than 5 after completion of copolymerization. More preferably, a chain transfer agent is used in copolymerization and pH is adjusted at a value of not lower than 5 after completion of copolymerization. The use of a chain transfer agent in copolymerization would provide easy adjustment of molecular weight of a copolymer obtained. In particular, when the polymerization is carried out in such a high concentration that total amount of the monomers to be used is not less than 30% by weight based on the total amount of raw material used in polymerization, use of a chain transfer agent would be effective.

The chain transfer agent to be used in the present invention is not especially limited so long as the compound enables to adjust molecular weight of a copolymer, and well-known chain transfer agents can be used. Specifically, a thiol-based chain transfer agent such as mercaptoethanol, thioglycerol, thioglycolic acid, mercaptopropionic acid, 2-mercaptopropionic acid, 3-mercaptopropionic acid, thiomalic acid, octyl thioglycolate, octyl 3-mercaptopropionate, 2-mercaptoethane sulfonic acid, n-dodecylmercaptane, octylmercaptane and butyl thioglycolate; a halide such as carbon tetrachloride, carbon tetrabromide, methylene chloride, bromoform and bromotrichloroethane; an unsaturated hydrocarbon compound such as α-methylstyrene dimer, α-terpinene, γ-terpinene, dipentene and terpinolene; a primary alcohol such as 2-aminopropane-1-ol; a secondary alcohol such as isopropanol; a suboxide and a salt thereof such as phosphorous acid, hypophosphorous acid and a salt thereof (such as sodium hypophosphite and potassium hypophosphite) or sulfurous acid, hydrogen sulfite, dithionous acid and metasulfurous acid and a salt thereof (such as sodium sulfite, potassium sulfite, sodium hydrogen sulfite, potassium hydrogen sulfite, sodium dithionite, potassium dithionite, sodium metabisulfite and potassium metabisulfite) may be included. On this occasion, a monomer with high chain transfer ability may be used as a chain transfer agent. The chain transfer agent may be used singly or in a mixed form of two or more kinds.

In the present invention, as a method for adding a chain transfer agent into a reactor, a method such as dropping and addition in portions may be preferably used. Further, the chain transfer agent may be added alone into a reactor or may be mixed in advance, for example, with a monomer having an oxyalkylene group composing of monomer components, or a solvent.

In the present invention, in view of handling, pH of a copolymer obtained by copolymerization may be preferably adjusted at a value of not lower than 5. However, if polymerization is carried out at a pH value of not lower than 5, polymerization rate would be lowered and at the same time, copolymerizability would be degraded, causing lowering of dispersing performance as a copolymer for a cement admixture. Therefore, a copolymerization is preferably carried out at a pH value below 5 and after the completion of copolymerization, pH is adjusted at a value of not lower than 5. The pH may be adjusted in the range of 4 to 5 by partial neutralization.

Adjustment of pH can be carried out, for example, by using an inorganic salt such as a hydroxide and a carbonate of a monovalent metal and a bivalent metal such as sodium hydroxide, potassium hydroxide, calcium hydroxide, sodium carbonate, potassium carbonate and calcium carbonate; ammonia; and an alkaline substance such as an organic amine. When the chain transfer agent is used, the copolymer obtained can also be used as it is as a main component of a cement admixture.

In the present invention, the monomers (A) and (B) along with the monomer (C), if necessary, are subjected to copolymerization in the presence of a polymerization initiator by a well-known method such as solution polymerization and mass polymerization. The polymerization initiator to be used herein is not especially limited, and well-known polymerization initiators can be used. As the initiator for copolymerization, usual radical polymerization initiators can be used. For example, as a radical polymerization initiator which can suitably be used in carrying out aqueous solution polymerization, for example, as a peroxide, persulfate such as ammonium persulfate, sodium persulfate and potassium persulfate and hydrogen peroxide can be used, and as an azo-type initiator, an azoamidine compound such as 2,2-azobis-2-methyl-propionamidine hydrochloride, a cyclic azoamidine compound such as 2-azobis-2-(2-imidazoline-2-yl)propane hydrochloride and 2-carbamoyl azoisobutyronitrile can be used. As a radical polymerization initiator which can be used in carrying out solution polymerization using lower alcohols, aromatic or aliphatic hydrocarbons, ester compounds, ketone compounds and the like as a solvent, or mass polymerization, for example, as a peroxides such as benzoyl peroxide, lauroyl peroxide, sodium peroxide, t-butyl hydroperoxide and cumene hydroperoxide; or as an azo-based initiator such as azobisisobutyronitrile can be used. Furthermore, when mixed solvents of water and lower alcohol are used, an initiator properly selected from the various radical polymerization initiators can be used. Mass polymerization is carried out at a temperature within the range of 50 to 200° C. The polymerization initiators may be used singly or in a mixed form of two or more kinds.

In addition, as an accelerator, a reducing agent such as sodium hydrogen sulfite, sodium sulfite, Mohr's salt, sodium pyrobisulfite, formaldehyde sodium sulfoxylate and ascorbic acid; and an amine compound such as ethylene diamine, tetrasodium ethylenediamine tetraacetate and glycin may be used in combination. The accelerators may be used singly or in a mixed form of two or more kinds.

Further, in copolymerization, it is preferable that polymerization is initiated with a redox type polymerization initiator using peroxide and a reducing agent in combination. The reducing agent is not especially limited so long as it is a general reducing agent, and, for example, salts of metals in low valency state, represented by Mohr's salts such as iron (II), tin (II), titanium (III), chromium (II), V (II) and Cu (II) salt; amine compounds and salts thereof such as monoethanol amine, diethanol amine, triethanol amine, hydroxylamine, hydroxylamine hydrochloride and hydrazine; sodium dithionite, formaldehyde sodium sulfoxylate, sodium hydroxymethane sulfinate dihydrate, as well as organic compounds having —SH, —SO$_2$H, —NHNH$_2$, —COCH(OH)— group and salts thereof; alkaline metal sulfites such as sodium sulfite, sodium hydrogen sulfite and sodium metadisulfite; or suboxides and salts thereof such as hypophosphorous acid, sodium hypophosphite, sodium hydrogen sulfite and sodium nitrite; invert sugar such as D-fructose and D-glucose; thiourea compounds such as thiourea and thiourea dioxide; L-ascorbic acid (salt), L-ascorbic acid ester, erythorbic acid (salt) and erythorbic acid ester may be included.

As a specific example of a combination of the peroxide and the reducing agent, for example, a combination of benzoylperoxide and an amine and a combination of cumene hydroperoxide and metal compounds such as iron (II) and Cu (II) may be included. Among these, in particular, a combination of a water-soluble peroxide and a reducing agent is especially preferable, and, for example, a combination of hydrogen peroxide and L-ascorbic acid, a combination of hydrogen peroxide and erythorbic acid, a combination of hydrogen peroxide and Mohr's salt, and a combination of sodium persulfate and sodium hydrogen sulfite are especially preferable. A combination of hydrogen peroxide and L-ascorbic acid is further especially preferable.

Amount of the peroxide to be used is preferably in the range of 0.01 to 30% by mole, further preferably 0.1 to 20% by mole, and most preferably 0.5 to 10% by mole, based on total amount of monomer components. The amount to be used below 0.01% by mole would increase an amount of unaltered monomers, whereas the amount to be used over 30% by mole would tend to produce polycarboxylic acid containing more oligomer portions, and is thus not preferable. Amount of the reducing agent to be used is preferably in the range of 0.1 to 500% by mole, further preferably 1 to 200% by mole, and most preferably 10 to 100% by mole, based on the peroxide. The amount to be used below 0.1% by mole would not sufficiently generate activated radicals and increase unaltered monomers, whereas the amount to be used over 500% by mole would increase residual reducing agent which is not reacted with hydrogen peroxide, and is thus not preferable.

In copolymerization, it is preferable that at least one of the peroxide and the reducing agent is always present in a reaction system. Specifically, this is fulfilled so long as the peroxide and the reducing agent are not added at the same time collectively. For example, both reagents may be added over a long period using continuous addition by dropping or addition in portions. When the peroxide and the reducing agent are added at the same time collectively, due to rapid reaction of the peroxide and the reducing agent, reaction control becomes difficult just after the addition, because of much amount of reaction heat, and moreover, due to rapid decrease in radical concentration after that, much amount of unaltered monomers will remain. Furthermore, radical concentration relative to monomers becomes extremely different between an initial stage and a second half of a reaction, resulting in remarkable widening of molecular weight distribution and lowering in performance as a cement admixture. In addition, time from addition of one reagent until starting addition of the other reagent is preferably within 5 hours, and especially preferably within 3 hours.

In the copolymerization method according to the present invention, copolymerization conditions such as copolymerization temperature may be appropriately determined depending on copolymerization method to be used, kind of solvent, polymerization initiator, chain transfer agent and the like to be used. In the copolymerization, to obtain high reactivity of monomers, polymerization may be preferably carried out at a temperature so that a half-life of radical polymerization initiator becomes 0.5 to 500 hours, preferably 1 to 300 hours and further preferably 3 to 150 hours. Hence, copolymerization temperature is usually preferably not lower than 0° C. and not higher than 150° C. More preferably, copolymerization temperature is not lower than 40° C., further preferably not lower than 50° C. and especially preferably not lower than 60° C. More preferably copolymerization temperature is also not higher than 120° C., further preferably not higher than 100° C. and especially preferably not higher than 85° C. For example, when a persulfate salt is used as an initiator, polymerization temperature is suitably in the range of 40 to 90° C., preferably in the range of 42 to 85° C. and further preferably in the range of 45 to 80° C. When hydrogen peroxide and L-ascorbic acid (salt) are used in combination as initiators, polymerization temperature is suitably in the range of 30 to 90° C., preferably in the range of 35 to 85° C. and further preferably in the range of 40 to 80° C. Polymerization time may be suitably in the range of 0.5 to 10 hours, preferably in the range of 0.5 to 8 hours and further preferably in the range of 1 to 6 hours. Polymerization time too longer or too shorter than these ranges would incur lowering of polymerization rate or lowering of productivity, and is thus not preferable.

In the present invention, mixing ratio of the monomers (A) and (B) used in polymerization of a copolymer is not especially limited so long as a copolymer with desired characteristics can be obtained. Preferable ratio by weight (% by weight) of the monomer (A): the monomer (B) is preferably 1 to 99:99 to 1, more preferably 50 to 99:50 to 1, further more preferably 65 to 98:35 to 2, especially preferably 75 to 97:25 to 3, and most preferably 80 to 95:20 to 5. On this occasion, total of the monomer (A) and the monomer (B) is 100% by weight.

Further, in the method of the present invention, when the monomer (C) is further used, mixing ratio of the monomer (C) is, in total amount of monomers (namely, based on total weight of the monomer (A), the monomer (B) and the monomer (C)), is in the range of 0.1 to 50% by weight, more preferably 0.5 to 20% by weight and most preferably 1 to 10% by weight. On this occasion, total of the monomer (A), the monomer (B) and the monomer (C) is 100% by weight.

In addition, a copolymer for a cement admixture according to the present invention may be produced as a blend, and weight average molecular weight thereof is not especially limited so long as desired characteristics can be fulfilled. Preferably weight average molecular weight of the copolymer is, as reduced to polyethylene glycol obtained by gel permeation chromatography (hereinafter, referred to as "GPC"), in the range of 5,000 to 300,000, more preferably in the range of 5,000 to 100,000, further more preferably in the range of 7,000 to 80,000, and most preferably in the range of 9,000 to 50,000. By appropriately selecting these ranges of weight ratio of these monomers and weight average molecular weight, a copolymer for a cement admixture having higher dispersing performance can be produced. In the present specification, weight average molecular weight of a polymer is a value measured under the following GPC measurement conditions.

<Measurement Conditions of Molecular Weight with GPC>

Column used: TSK guard column SWXL+TSKgel G4000SWXL+G3000SWXL+G2000SWXL, produced from Tosoh Corp.

Eluting solution: An elution solution prepared from mixed solvents of 10999 g of water and 6001 g of acetonitrile dissolved with 115.6 g of sodium acetate trihydrate and further adjusted in pH at 6.0 with acetic acid was used.

Injection volume: 100 μL of a 0.5% elution solution.

Flow rate of eluting solution: 0.8 mL/min.

Column temperature: 40° C.

Standard substance: Polyethylene glycol with peak top molecular weight (Mp) of 272500, 219300, 85000, 46000, 24000, 12600, 4250, 7100 and 1470.

Order of a calibration line: Third order equation

Detector: 410 differential refractive index detector, produced from Nihon Waters K. K.

Analysis software: MILLENNIUM Ver. 3.21, produced from Nihon Waters K.K.

Further, a second aspect of the present invention is to provide a cement admixture which comprises a copolymer of at least one unsaturated polyalkylene glycol ether-based monomer (A) represented by the formula (1) with at least one unsaturated organic acid-based monomer (B) represented by the formula (2), characterized in that the addition amount of the cement admixture required for attaining a flow value of 250±5 mm by a mortar test method (X), as reduced to a solid content, is below 93% by weight based on an addition amount of a polycarboxylic acid-based copolymer (Y), as reduced to a solid content. Such copolymer can be preferably produced by the method of the present invention. According to the method of the present invention as described above, a copolymer with more uniform monomer composition or a blend of a plurality of copolymers having different monomer compositions can be produced, and in particular, a copolymer with uniform monomer composition can exhibit superior water reducing performance as compared with a conventional polycarboxylic acid-based copolymer.

In the present invention, in a mortar test method (X), percentage (%) of an addition amount of a cement admixture, as reduced to a solid content, required for obtaining a flow value of 250±5 mm, based on an addition amount of a polycarboxylic acid-based copolymer (Y), as reduced to a solid content, is essentially required to be below 93% by weight, preferably not higher than 92% by weight, more preferably not higher than 90% by weight, further more preferably not higher than 85% by weight, and most preferably not higher than 80% by weight. In this connection, the percentage shows a degree of improvement in water reducing performance relative to that of a polycarboxylic acid-based copolymer which has obtained by a conventional producing method and generally used as a cement admixture, and hence a lower value means more superior in water reducing performance. Therefore, the lower limit of the percentage is not especially specified, however, the lower limit is in general 50% by weight, and preferably 65% by weight. In view of increasing amount of active component, which largely contributes to water reducing performance, and/or productivity, reaction rate of the monomer (A) of a copolymer is preferably not lower than 87%, and more preferably not lower than 90%. In addition, reaction rate of the monomer (B) is preferably not lower than 95%, more preferably not lower than 97%, and most preferably not lower than 98%.

In the present specification, "mortar test method (X)" is carried out as follows.

<Mortar Test Method (X)>

A mixer for mechanical mixing, a spoon, a flow table, a flow cone and a plunging rod in accordance with JIS-R5201-1997 were used. On this occasion, a mortar test was carried out in accordance with JIS-R5201-1997, unless otherwise specified.

Materials and formulation of mortar used for the test are 900 g of ordinary portland cement made by Taiheiyo Cement K.K., 1350 g of a standard sand for testing cement strength specified in JIS R 5201-1997, and 270 g of ion-exchanged water containing an aqueous solution of various polymers and an antifoaming agent. In this case, the antifoaming agent was added to avoid effects of air bubbles on dispersibility of a mortar composition, that is, to maintain an air amount not higher than 3.0%. Specifically, an alkylalkylene oxide-based antifoaming agent was used in an amount of 0.1%, based on a copolymer for a cement admixture. When an air amount in a mortar was more than 3.0%, an addition amount of the antifoaming agent was adjusted so that the air amount became not higher than 3.0%.

Mortar was prepared by mixing at room temperature (20±2° C.) for 4.5 minutes using a mixer for mechanical mixing. Specifically, specified amounts of cement and sand were charged into a mixing pot and started the mixer at slow rate. After 15 seconds from starting a paddle, water containing specified amount of a cement admixture and an antifoaming agent was charged over 15 seconds. After further mixing for 15 seconds at slow rate, mixing was continued for 105 seconds at high rate. After the mixing pot was taken off from the mixer, and stopping the mixing for 120 seconds (after 4 minutes and 30 seconds from the first mixing at low speed), the content was stirred with a spoon 10 times each toward right and left directions. Thus mixed mortar was packed in two layers in a flow cone placed on a flow table. Each layer was plunged with a plunging rod 15 times each over the whole surface so that a tip of the plunging rod was penetrated down to about ½ depth of each layer, and finally shortfall was made up and the surface was smoothed. After 6 minutes from starting the first mixing at slow rate, the flow cone was lifted up vertically, then diameters of the mortar spread on the table were measured in two directions, whose average value was recorded as a flow value. An addition amount of a copolymer for a cement admixture was adjusted so that the initial flow value became 250±5 mm.

In the present specification, "polycarboxylic acid-based copolymer (Y)" is one of polycarboxylic acid-based copolymers conventionally fulfilling superior water reducing performance and is used as a standard substance for the flow value by the mortar test method (X). "Polycarboxylic acid-based copolymer (Y)" is produced as follows.

<Method for Producing Polycarboxylic Acid-Based Copolymer (Y)>

Into a glass-made reactor equipped with a thermometer, a stirrer, a dropping apparatus, a nitrogen introducing tube and a reflux condenser, 24.63 parts of ion-exchange water and 47.72 parts of an adduct of ethylene oxide (an average addition mole number of ethylene oxide 50) to a hydroxyl group of 3-methyl-3-buten-1-ol(isoprenol) (hereinafter, referred to IPN-50) were charged. After nitrogen purging in the reactor with stirring then heating up to 60° C. under nitrogen atmosphere, 3.75 parts of an aqueous 2% hydrogen peroxide solution was added thereto, and then 8.07 parts of an aqueous 80% acrylic acid solution (B) was added dropwise over 3 hours. At the same time as starting the dropwise addition of the monomer (B), an aqueous solution containing 0.20 part of 3-mercaptopropionic acid, 0.10 part of L-ascorbic acid and 15.54 parts of ion-exchanged water was added dropwise over 3.5 hours. Then, after the temperature of solution was maintained at 60° C. for another 1 hour, the solution was cooled to complete the polymerization. After that, at a temperature not higher than the polymerization temperature (30° C.), the reaction solution was neutralized using an aqueous sodium hydroxide solution so as to reach pH of 7, to obtain an aqueous solution of a polycarboxylic acid-based copolymer (Y) having a weight average molecular weight of about 38,000.

As a standard substance, a polycarboxylic acid-based copolymer with a weight average molecular weight of 37,000 to 40,000 was used.

Further, a third aspect of the present invention is provide a cement admixture which comprises a copolymer obtained by polymerizing monomer components comprising at least one unsaturated polyalkylene glycol ether-based monomer (A) represented by the formula (1) and (meth)acrylic acid-based monomer as a monomer (B), wherein a content of a (meth) acrylic acid dimer in the (meth)acrylic acid-based monomer used as the monomer (B) is not higher than 5% by weight, based on the (meth)acrylic acid-based monomer.

In the aspect, the (meth)acrylic acid-based monomer used as the monomer (B) is not especially limited. For example, acrylic acid and methacrylic acid, along with salts thereof such as an alkali metal salt, an alkaline earth metal salt and an organic amine salt can be used. In this connection, "(meth) acrylic acid dimer" means a dimer formed by addition of two molecules of (meth)acrylic acid and the like, including, for example, β-acryloxypropanic acid, β-methacryloxyisobutanoic acid, β-methacryloxypropanic acid and β-acryloxyisobutanoic acid; along with salts thereof such as alkali metal salt, alkaline earth metal salt, and organic amine salt. Among these, in view of improvement of cement dispersibility, acrylic acid and/or salts of acrylic acid are preferably used as a monomer component. Therefore, according to the embodiment, the content of dimers such as β-acryloxypropanic acid and/or salts thereof such as an alkali metal salt, an alkaline earth metal salt and an organic amine salt in acrylic acid and/or salts of acrylic acid is preferably not higher than 5% by weight based on the (meth)acrylic acid-based monomer. On this occasion, the content of the (meth)acrylic acid dimer over 5% by weight would lower cement dispersibility of a copolymer obtained. Although the reason for this is not clear, it is speculated that by the presence of the (meth)acrylic acid dimers, morphology of the copolymer obtained becomes different one from desired morphology. Therefore, the content of the (meth)acrylic acid dimers contained in (meth)acrylic acid should be not higher than 5% by weight (namely, 0 to 5% by weight), preferably 0 to 3% by weight, and more preferably 0 to 1% by weight, based on the (meth)acrylic acid-based monomer. On this occasion, since the content of the (meth) acrylic acid dimers is preferably as low as possible, the lower limit was specified to be 0% by weight in the range. In the case of (meth)acrylic acid commercially easily available, the content of the (meth)acrylic acid dimers is preferably in the range of 0.01 to 5% by weight, more preferably 0.01 to 3% by weight, and further more preferably 0.01 to 1% by weight, based on the (meth)acrylic acid-based monomer.

Further, when acrylic acid is used as a monomer component, the content impurities in acrylic acid are preferably as low as possible. Specifically, preferably, a content of furfural is not higher than 1,000 ppm and a content of benzaldehyde is not higher than 500 ppm and the like; more preferably, a content of furfural is not higher than 100 ppm and a content of benzaldehyde is not higher than 100 ppm and the like; further more preferably, a content of furfural is not higher than 50 ppm and a content of benzaldehyde is not higher than 50 ppm and the like; and especially preferably, a content of furfural is not higher than 10 ppm and a content of benzaldehyde is not higher than 10 ppm and the like. In addition, maleic acid may be contained in acrylic acid, and in such case, a content of maleic acid present in acrylic acid as impurity is preferably not higher than 500 ppm, and more preferably not higher than 50 ppm. On the other hand, maleic acid may positively be formulated, if necessary, as a monomer component. Further, the (meth)acrylic acid dimers may be formed during storage of the (meth)acrylic acid-based monomer. In order to prevent such formation, it is preferable that the (meth)acrylic acid-based monomer is stored preferably at a temperature not higher than 40° C., and more preferably at a temperature not higher than 30° C. until use in the polymerization.

In the present specification, the content of the (meth) acrylic acid dimers is defined as a value measured with liquid chromatography by a method in accordance with JIS K0124: 2002.

In the third aspect of the present invention, the unsaturated polyalkylene glycol ether-based monomer (A) may be used singly or in a mixed form of two or more kinds. In addition, as the (meth)acrylic acid-based monomer, each of acrylic acid or methacrylic acid may be used alone or both may be used in a mixed state. Also as the monomer (B), further an unsaturated dicarboxylic acid-based monomer such as maleic acid, position ratio in charging (% by weight)" represents a composition ratio (% by weight) of acrylic acid to an IPN monomer after complete neutralization of acrylic acid to sodium acrylate (SA). Acrylic acid containing an acrylic acid dimer, (β-acryloxypropanic acid), may be used as a monomer component, however, the content of the acrylic acid dimer in the acrylic acid is, as described above, in the range of 0 to 5% by weight, preferably 0 to 3% by weight, and further preferably 0 to 1% by weight, based on acrylic acid. On this occasion, since the content of an acrylic acid dimer is preferably as low as possible, the lower limit in the range was specified to be 0% by weight. In the case of acrylic acid commercially easily available, the content of an acrylic acid dimer is preferably in the range of 0.01 to 5% by weight, more preferably 0.01 to 3% by weight, and further more preferably 0.01 to 1% by weight, based on acrylic acid.

TABLE 1

| IPN monomer | Average addition mols of EO | Addition amount of acrylic acid (% by weight) | | | Rate of change | Composition ratio in charge (% by weight) | |
|---|---|---|---|---|---|---|---|
| | | 1st stage | 2nd stage | Total | | IPN monomer | SA |
| IPN-25 | 25 | 6.03 | 2.84 | 8.87 | 2.1 | 88.73 | 11.27 |
| IPN-25 | 25 | 8.95 | 1.80 | 10.75 | 5.0 | 86.41 | 13.59 |
| IPN-50 | 50 | 1.40 | 1.70 | 3.10 | 1.2 | 95.99 | 4.01 |
| IPN-50 | 50 | 1.50 | 3.20 | 4.70 | 2.1 | 93.95 | 6.05 |
| IPN-50 | 50 | 2.32 | 3.53 | 5.85 | 1.5 | 92.50 | 7.50 |
| IPN-50 | 50 | 3.53 | 2.32 | 5.85 | 1.5 | 92.50 | 7.50 |
| IPN-50 | 50 | 4.00 | 2.60 | 6.60 | 2.1 | 91.55 | 8.45 |
| IPN-50 | 50 | 6.03 | 2.84 | 8.87 | 2.1 | 88.73 | 11.27 |
| IPN-50 | 50 | 2.84 | 6.03 | 8.87 | 2.1 | 88.73 | 11.27 |
| IPN-50 | 50 | 1.85 | 7.01 | 8.86 | 3.8 | 88.74 | 11.26 |
| IPN-50 | 50 | 8.90 | 3.00 | 11.90 | 2.3 | 85.01 | 14.99 |
| IPN-75 | 75 | 1.40 | 2.50 | 3.90 | 1.8 | 94.97 | 5.03 |
| IPN-75 | 75 | 5.02 | 1.95 | 6.97 | 2.6 | 91.09 | 8.91 |
| IPN-75 | 75 | 5.05 | 1.45 | 6.50 | 3.5 | 91.68 | 8.32 | itaconic acid, citraconic acid and fumaric acid may be used. Furthermore, in addition to the monomers (A) and (B), the third unsaturated monomer (C) may also be used singly or in a mixed form of two or more kinds. A method for copolymerization of the monomers (A) and (B) along with the third monomer (C), if necessary, is not especially limited, and well-known copolymerization methods as described above can similarly be used.

The suitable embodiments of the cement admixture according to the present invention are shown in Table 1 below. In Table 1 below, "IPN monomer" represents a monomer derived from isoprenol(3-methyl-3-butene-1-ol) added with ethylene oxide to a hydroxyl group thereof, and the number described after the abbreviation, IPN, represents an average addition mole number of ethylene oxide (EO). Furthermore, "addition amount of acrylic acid (% by weight)" represents percent by weight of an addition amount of acrylic acid based on the total monomer components, "in the first stage" represents an addition amount (% by weight) of acrylic acid before the addition rate of acrylic acid is changed, "in the second stage" represents an addition amount (% by weight) of acrylic acid after the addition rate of acrylic acid is changed, "rate of change (%)" represents a percentage obtained from the larger value of the addition amounts of acrylic acid before or after the addition rate of acrylic acid is changed, divided by the smaller value, and rounded off at one place of decimal to the nearest whole number. For example, "rate of change" in the first line of Table 1 below is calculated as 6.03/2.84=2.12 . . . =2.1 and "rate of change" in the third line is calculated as 1.70/1.40= . . . 1.21=1.2. Furthermore, "com- The cement admixture relevant to the present invention contains the copolymer/copolymer blend as an essential component. The cement admixture relevant to the present invention may be composed of only the copolymer/copolymer blend according to the present invention, or may contain other additives. In the latter case, the other additives to be sued may include those cited in the (1) to (20) as below. Such a cement admixture can be used as a cement composition by mixing with cement, and the like. In addition, the cement admixture or the copolymer relevant to the present invention is also effective in a hydraulic composition using hydraulic material other than cement. Specifically, the hydraulic composition includes, for example, one essentially containing the copolymer according to the present invention and gypsum. The cement composition relevant to the present invention may further contain water, and by containing water, hydraulic property is expressed and the composition becomes hardened. The cement composition of the present invention may contain, if necessary, fine aggregate (e.g. sand) or coarse aggregate (e.g. crushed stone). A specific example of such cement composition includes, for example, cement paste, mortar, concrete and plaster. In addition, the cement composition relevant to the present invention can also be used for ultrahigh strength concrete.

In this connection, "ultrahigh strength concrete" means one generally so called in a cement composition field, namely, such concrete whose hardened material has an equivalent or higher strength compared with that of a conventional cement, even when water/cement ratio is reduced. For example, the ultrahigh strength concrete means such concrete as that has workability not to impair usual use even when water/cement ratio is not higher than 25% by weight, further not higher than 20% by weight, especially not higher than 18% by weight, more especially not higher than 14% by weight and further more especially not higher than 12% by weight, and also whose hardened material has a compression strength not lower than 60 N/mm$^2$, further not lower than 80 N/mm$^2$, more further not lower than 100 N/mm$^2$, especially not lower than 120 N/mm$^2$, more especially not lower than 160 N/mm$^2$ and further more especially not lower than 200 N/mm$^2$.

Now, such cement composition will be explained below.

Cement which can be used is not especially limited and known types of cement can be used, and, for example, Portland cement (normal, high early strength, ultra high early strength, moderate heat, sulfate resistant and each low alkali type thereof), various mixed cement (blast furnace slag cement, silica cement, fly ash cement), white Portland cement, alumina cement, ultra fast-cure cement (1 clinker fast-cure cement, 2 clinkers fast-cure cement, magnesium phosphate cement), grout cement, oil well cement, low heat cement (low heat type blast furnace slag cement, fly ash mixed low heat type blast furnace slag cement, Blite-rich cement), ultra high strength cement, cement-based solidification material and eco-cement (cement produced from one or more kinds of municipal solid waste incinerated ash and sewage sludge incinerated ash as raw material) may be included, and further fine powder such as blast furnace slug, fly ash, cinder ash, clinker ash, husk ash, silica fume, silica powder and limestone powder may be added.

As the aggregate, in addition to pebble, crushed stone, water granulation slug and regenerated aggregate, etc., refractory aggregates such as silica-based, clay-based, zirconium-based, high alumina-based, silicon carbide-based, graphite-based, chrome-based, chrome-magnesite-based and magnesia-based materials can be used. In the cement composition, unit water amount and cement amount per 1 m$^3$ thereof and water/cement ratio are not especially limited, however, a unit water amount of 100 to 185 kg/m$^3$, a cement amount of 250 to 800 kg/m$^3$ and a water/cement ratio of 10 to 70% by weight; and preferably a unit water amount of 120 to 175 kg/m$^3$, a cement amount of 270 to 800 kg/m$^3$ and a water/cement ratio of 20 to 65% by weight may be recommendable, and a wide range from the poor compounding to the rich compounding can be used. The cement admixture of the present invention is effective to any of high strength concrete with high content of unit cement amount or poor compounding concrete with a unit cement amount of not higher than 300 kg/m$^3$.

In a cement composition, compounding ratio of the cement admixture is not especially limited. When it is used for mortar or concrete with hydraulic cement, the cement admixture is added in an amount of 0.01 to 10% by weight, preferably 0.05 to 8% by weight, and more preferably 0.1 to 5% by weight, based on 100 parts by weight of cement. By this addition, various beneficial effects such as reduced unit water amount, increased strength and improved durability can be furnished. A compounding ratio below 0.01% is insufficient in view of performance, whereas even the additive is used in a high ratio over 10%, the ratio results in substantial saturations of those effects and is disadvantageous in view of economy. The "% by weight" is a converted value to a solid content.

The cement admixture of the present invention can be used in combination with a cement dispersing agent usually used. As the cement dispersing agent, the followings are suitable.

Lignin sulfonic acid salts; polyol derivatives; naphthalene sulfonic acid formalin condensates; melamine sulfonic acid formalin condensates; polystyrene sulfonic acid salts; amino sulfonic acids such as aminoaryl sulfonic acid—phenol—formaldehyde condensates as described in JP-A-1-113419; cement dispersing agents containing as component (a) a copolymer of a polyalkylene glycol mono(meth)acrylate-based compound and a (meth)acrylic acid-based compound and/or salt thereof, as a component (b) a copolymer of a polyalkylene glycol mono(meth)allyl ether-based compound and maleic anhydride and/or hydrolysate thereof and/or salt thereof; and as a component (c) a copolymer of a polyalkylene glycol mono(meth)allyl ether-based compound and polyalkylene glycol maleate, and/or salt thereof as described in JP-A-7-267705; concrete admixtures containing as a component A a copolymer of polyalkylene glycol(meth)acrylate and (meth)acrylic acid (salt), as a component B a specific polyethyleneglycol polypropyleneglycol-based compound and as a component C a specific surfactant as described in Japanese Patent No. 2508113; a copolymer composed of polyethylene(propylene)glycol(meth)acrylate or polyethylene(propylene)glycol mono(meth)allyl ether, (meth)allyl sulfonic acid (salt) and (meth)acrylic acid (salt) as described in JP-A-62-216950.

A copolymer composed of polyethylene(propylene)glycol (meth)acrylate, (meth)allyl sulfonic acid (salt) and (meth) acrylic acid (salt) as described in JP-A-1-226757; a copolymer composed of polyethylene(propylene)glycol(meth)acrylate, (meth)allyl sulfonic acid (salt) or p-(meth)allyloxybenzene sulfonic acid (salt) and (meth)acrylic acid (salt) as described in JP-B-5-36377; a copolymer containing polyethylene glycol mono(meth)allyl ether and maleic acid (salt) as described in JP-A-4-149056; a copolymer composed of polyethylene glycol(meth)acrylate, (meth)allyl sulfonic acid (salt), (meth)acrylic acid (salt), alkanediol mono(meth) acrylate, polyalkylene glycol mono(meth)acrylate, and an α,β-unsaturated monomer having an amide group in its molecule as described in JP-A-5-170501; a copolymer composed of polyethylene glycol mono(meth)allyl ether and polyethylene glycol mono(meth)acrylate, alkyl(meth)acrylate, (meth) acrylic acid (salt) and (meth)allyl sulfonic acid (salt) or p-(meth)allyloxybenzene sulfonic acid (salt) as described in JP-A-6-191918; a copolymer composed of alkoxypolyethylene glycol monoally ether and maleic anhydride or hydrolysates thereof, or salt thereof as described in JP-A-5-43288; a copolymer composed of polyethylene glycol monoallyl ether, maleic acid, and a copolymerizable monomer with these monomers, or salt thereof or ester thereof as described in JP-B-58-38380.

A copolymer composed of polyethylene glycol mono (meth)acrylate-based monomer, (meth)acrylic acid-based monomer, and a copolymerizable monomer with these monomers as described in JP-B-59-18338; a copolymer composed of (meth)acrylic acid ester having sulfonic acid group and optionally a copolymerizable monomer with these monomers, or salt thereof as described in JP-A-62-119147; an esterified product between a copolymer composed of alkoxypolyalkylene glycol monoallyl ether and maleic anhydride, and a polyoxyalkylene derivative having an alkenyl group at the terminal as described in JP-A-6-271347; an esterified product between a copolymer composed of alkoxypolyalkylene glycol monoallyl ether and maleic anhydride, and a polyoxyalkylene derivative having a hydroxyl group at the terminal as described in JP-A-6-298555; and a polycarboxylic acid (salt) such as a copolymer composed of an alkenyl ether-based monomer of a specified unsaturated alcohol such as 3-methyl-3-buten-1-ol added with ethylene oxide, an unsaturated carboxylic acid-based monomer and a copolymerizable monomer with these monomers, or salt thereof as described in JP-A-62-68806. These cement dispersing agents may be used singly or in a mixed form of two or more kinds.

When the cement dispersing agent is used in combination, a formulation ratio by weight of the cement admixture to the cement dispersing agent is preferably in the range of 5 to 95:95 to 5, more preferably 10 to 90:90 to 10, although the ratio depends on kind of cement dispersing agent and formulation to be used as well as test conditions and cannot be determined unambiguously.

Alternatively, the cement admixture of this invention may further comprise one or more of other known cement admixture (additive). As the other cement admixture, conventional cement admixtures as listed below can be used.

(1) Water-soluble polymeric substances: unsaturated carboxylic acid polymers such as polyacrylic acid (sodium salt), polymethacrylic acid (sodium salt), polymaleic acid (sodium salt), and acrylic acid-maleic acid copolymer sodium salt; polymers of polyoxyethylene and polyoxypropylene such as polyethylene glycol and polypropylene glycol, and copolymers thereof; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation such as yeast glucans, xanthan gum, β-1,3-glucans (linear or branched, e.g. curdlan, paramylon, pachyman, scleroglucan, rhamnalan) and the like; polyacrylamide; polyvinyl alcohol; starch; starch phosphoric acid ester; sodium alginate; gelatin; acrylic acid copolymers having an amino group in its molecule and quaternary products thereof.

(2) Polymer emulsions: copolymers of various vinyl monomer such as alkyl(meth)acrylates.

(3) Retardants: oxycarboxylic acids and salts thereof, such as gluconic acid, glucoheptonic acid, arabonic acid, malic acid, citric acid, and inorganic or organic salts thereof such as sodium, potassium, calcium, magnesium, ammonium and triethanolamine salts; monosaccharides such as glucose, fructose, galactose, saccharose, xylose, apiose, ribose and invert sugar, oligosaccharides such as disaccharides and trisaccharides, such oligosaccharides as dextrin, polysaccharides such as dextran, and other saccharides such as molasses containing these saccharides; sugar alcohols such as sorbitol; magnesium silicofluoride; phosphoric acid and salts thereof, or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid), and alkali metal or alkaline earth metal salts thereof, etc.

(4) Early strengthening agents/accelerators: soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; calcium-aluminate cement; calcium aluminosilicate, etc.

(5) Mineral oil-based antifoaming agents: kerosene, liquid paraffin, etc.

(6) Fat- or oil-based antifoaming agents: animal or vegetable oils, sesame oil, castor oil, and the alkylene oxide adducts thereof, etc.

(7) Fatty acid-based antifoaming agents: oleic acid, stearic acid, and the alkylene oxide adducts thereof, etc.

(8) Fatty acid ester-based antifoaming agents: glycerol monoricinolate, alkenylsuccinic acid derivatives, sorbitol monolaurate, sorbitol trioleate, natural waxes, etc.

(9) Oxyalkylene type antifoaming agents: polyoxyalkylenes such as (poly)oxyethylene(poly)oxypropylene adducts; (poly)oxyalkyl ethers such as diethylene glycol heptyl ether, polyoxyethylene oleyl ether, polyoxypropylene butyl ether, polyoxyethylenepolyoxypropylene 2-ethylhexyl ether, and higher $C_{12}$-$C_{14}$ alcohol-oxyethyleneoxypropylene adducts; (poly)oxyalkylene(alkyl)aryl ethers such as polyoxypropylene phenyl ether and polyoxyethylene nonylphenyl ether; acetylene ethers produced by addition polymerization of an alkylene oxide onto an acetylene alcohol such as 2,4,7,9-tetramethyl-5-decyne-4,7-diol, 2,5-dimethyl-3-hexyne-2,5-diol or 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl)ether sulfate ester salts such as polyoxypropylene methyl ether sulfate sodium salt and polyoxyethylene dodecylphenyl ether sulfate sodium salt; (poly)oxyalkylene alkylphosphate esters such as polyoxyethylene stearylphosphate; (poly)oxyalkylenealkylamines such as polyoxyethylenelaurylamine; polyoxyalkyleneamides, etc.

(10) Alcohol-based antifoaming agents: octyl alcohol, hexadecyl alcohol, acetylene alcohols, glycols, etc.

(11) Amide-based antifoaming agents: acrylate polyamines, etc.

(12) Phosphate ester-based antifoaming agents: tributyl phosphate, sodium octylphosphate, etc.

(13) Metal salt-based antifoaming agents: aluminum stearate, calcium oleate, etc.

(14) Silicone-based antifoaming agents: diemthylsilicone oil, silicone paste, silicone emulsions, organic group-modified polysiloxanes (organosiloxanes such as dimethylpolysiloxane), fluorosilicone oils, etc.

(15) Air-entraining (AE) agents: resin soaps, saturated or unsaturated fatty acids, sodium hydroxystearate, lauryl sulfate, ABSs (alkylbenzenesulfonates), LASs (linear alkylbenzenesulfonates), alkanesulfonates, polyoxyethylene alkyl (phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, α-olefinsulfonates, etc.

(16) Other surfactants: polyalkylene oxide derivatives derived from aliphatic monohydric alcohols of 6 to 30 carbon atoms within the molecule, such as octadecyl alcohol and stearyl alcohol, alicyclic monohydric alcohols of 6 to 30 carbon atoms within the molecule, such as abietyl alcohol, monofunctional mercaptans of 6 to 30 carbon atoms within the molecule, such as dodecylmercaptan, alkylphenols of 6 to 30 carbon atoms within the molecule, such as nonylphenol, amines of 6 to 30 carbon atoms within the molecule, such as dodecylamine, or carboxylic acids of 6 to 30 carbon atoms within the molecule, such as lauric acid and stearic acid, by addition of not less than 10 moles of an alkylene oxide (s) such as ethylene oxide and propylene oxide; alkyldiphenyl ether sulfonic acid salts in which two sulfo-containing phenyl groups, which may optionally have an alkyl group or alkoxy group as a substituent, is bonded via ether bonding; various anionic surfactants; various cationic surfactants such as alkylamine acetates and alkyltrimethylammonium chlorides; various nonionic surfactants; various amphoteric surfactants, etc.

(17) Waterproofing agents: fatty acids (salts), fatty acid esters, fats and oils, silicones, paraffins, asphalt, waxes, etc.

(18) Rust preventives: nitrite salts, phosphate salts, zinc oxide, etc.

(19) Cracking reducing agents: polyoxyalkyl ethers; alkane diols such as 2-methyl-2,4-pentanediol, etc.

(20) Expansive admixtures: ettringite type, coal-derived type, etc.

As other conventional cement admixtures (ingredients), cement wetting agents, thickening agents, sepaproportionn reducing agents, flocculants, drying shrinkage-reducing agent, strength increasing agents, self-leveling agents, rust-preventing agent, colorants, antifungal agents, blast furnace slag, fly ash, cinder ash, clinker ash, husk ash, silica fume, silica powder, and gypsum and the like can be used. These cement admixtures (additives) can be used singly or in combination of two or more members.

The cement admixture of this invention can be used in combination of an agent of improving dispersion and foam depression of a cement composition, as well as the conventional cement dispersants and cement admixtures (additives) as mentioned above.

As a method for adding the cement admixture and the cement dispersant to a cement composition, a method which comprises mixing the cement admixture and the cement dispersant to prepare a cement admixture, to easily admix the cement admixture the cement composition may be preferably used.

In the cement composition, as especially preferable embodiments of the components other than cement and water, the following (a) to (f) may be included:

(a) A combination comprising as essential components two components, the cement admixture relevant to the present invention and an oxyalkylene-base antifoaming agent. As the oxyalkylene-base antifoaming agent, a well-known oxyalkylene-base antifoaming agent can be used without particular limitation, and, for example, polyoxyalkylenes, polyoxyalkylene alkyl ethers, polyoxyalkylene acetylene ethers and polyoxyalkylene alkyl amines can be used, and polyoxyalkylene alkyl amines may be especially suitable. Formulation ratio by weight of the oxyalkylene-base antifoaming agent is preferably in the range of 0.01 to 20% by weight based on the cement admixture.

(b) A combination comprising as essential components three components, the cement admixture relevant to the present invention, an oxyalkylene-base antifoaming agent, and an AE agent. As the oxyalkylene-base antifoaming agent, similar one as in (a) above can be used. As the AE agent, a well-known AE agent can similarly be used without particular limitation, and AE agents cited in the above (15) can be used. Among these, higher alcohol sulfate esters and salts thereof such as resin soap, fatty acid soap and lauryl sulfate; polyoxyethylenealkyl(phenyl)ether, polyoxyethylenealkyl(phenyl)ether sulfate esters or salts thereof, polyoxyethylenealkyl(phenyl)ether phosphate esters or salts thereof can be used. Formulation ratio by weight of the antifoaming agent to the cement admixture is preferably in the range of 0.01 to 20% by weight, based on the cement admixture. On the other hand, formulation ratio by weight of the AE agent is preferably in the range of 0.001 to 2% by weight, based on cement.

(c) A combination comprising as essential components two components, the cement admixture relevant to the present invention and a material separation reducing agent. As the material separation reducing agent, a well-known material separation reducing agent can be used without particular limitation. For example, various thickeners such as nonionic cellulose ethers and compounds having, as partial structure, a hydrophobic substituent composed of a hydrocarbon chain with carbon atoms of 4 to 30 and a polyoxyalkylene chain added with as average addition mole number 2 to 300 alkylene oxides with carbon atoms of 2 to 18 can be used. Formulation ratio by weight of the cement admixture and the material separation reducing agent is preferably in the range of 10/90 to 99.99/0.01, and more preferably 50/50 to 99.9/0.1. A cement composition of this combination is suitable as high flow concrete, self-filling concrete and self-leveling material.

(d) A combination comprising as essential components two components, the cement admixture relevant to the present invention and a retardant. As the retardant, a well-known retardant can similarly be used without particular limitation. For example, oxycarboxylic acids such as gluconic acid (salt), citric acid (salt); saccharides such as glucose; sugar alcohols such as sorbitol; and phosphonic acids such as aminotri(methylenephosphonic acid) can be used, and oxycarboxylic acids are especially suitable. Formulation ratio by weight of the cement admixture and the retardant is preferably in the range of 10/90 to 99.9/0.1, and more preferably in the range of 20/80 to 99/1.

(e) A combination comprising as essential components two components, the cement admixture relevant to the present invention and an accelerator. As the accelerator, a well-known accelerator can similarly be used without particular limitation. For example, soluble calcium salts such as calcium chloride, calcium nitrite and calcium nitrate; chlorides such as iron chloride and magnesium chloride; thiosulfate salts; formic acid; and formates such as calcium formate can be used. Formulation ratio by weight of the cement admixture and the accelerator is preferably in the range of 0.1/99.9 to 90/10, and more preferable in the range of 1/99 to 70/30.

(f) A combination comprising as essential components two components, the cement admixture relevant to the present invention and a sulfonic acid-based dispersing agent having a sulfonic acid group in a molecule. As the sulfonic acid-based dispersing agent, a well-known sulfonic acid-based dispersing agent can similarly be used without particular limitation. For example, a dispersing agent based on lignin sulfonate salts, condensates of naphthalene sulfonic acid—formalin, condensates of melamine sulfonic acid—formalin, polystyrene sulfonate salts and condensates of aminoaryl sulfonic acid-phenol-formaldehyde can be used. Formulation ratio by weight of the cement admixture and the sulfonic acid-based dispersing agent is preferably in the range of 5/95 to 95/5, and more preferably in the range of 10/90 to 90/130.

As described above, the cement admixture of the present invention can advantageously be applied to various cement compositions, maintain superior slump retention ability and fluidity of a cement composition, and the like, and provide a viscosity for easy workability at a site where the cement composition is used. Therefore, by using the cement admixture relevant to the present invention, water reducing performance of a cement composition can be improved and superior strength or durability of hardened material thereof can be provided, along with viscosity for easy workability at a site where the cement composition is used, and thus work efficiency in building of civil engineering and construction structures, etc. can be improved. Therefore, a cement composition containing the cement admixture relevant to the present invention should be involved in the present invention.

EXAMPLES

The present invention will be explained in more detail by means of Examples below. The present invention, however, is by no means limited only to these Examples. As used herein, "parts" means "parts by weight" and "%" means "% by weight" unless otherwise specified.

Example 1

Into a glass-made reactor equipped with a thermometer, a stirrer, a dropping apparatus, a nitrogen introducing tube and a reflux condenser, 25.48 parts of ion-exchanged water and 49.37 parts of an adduct of ethylene oxide (an average addition mole number of ethylene oxide 50) to a hydroxyl group of 3-methyl-3-buten-1-ol(isoprenol) (hereinafter, referred to IPN-50) were charged. After nitrogen purging in the reactor with stirring and heating up to 60° C. under nitrogen atmosphere, 3.00 parts of an aqueous 2% hydrogen peroxide solution was added thereto, and 4.08 parts of an aqueous 80% acrylic acid (B1) solution was dropped thereto over 1.5 hours. After completion of the dropping of the monomer (B1), 1.92 parts of an aqueous 80% acrylic acid (B2) solution was dropped the mixture over 1.5 hours. As soon as starting dropping of the monomer (B1), an aqueous solution containing 0.16 part of 3-mercaptopropionic acid, 0.08 part of L-ascorbic acid and 15.91 parts of ion-exchanged water was further dropped over 3.5 hours. Then, after a temperature of the solution was maintained at 60° C. for another 1 hour, the solution was cooled to complete the polymerization. Thereafter, the reaction solution was neutralized using an aqueous solution of sodium hydroxide to pH=7 at a temperature not higher than the polymerization temperature (30° C.), to obtain an aqueous solution of a polymer (P-1) having a weight average molecular weight of about 42,000. Residual contents of IPN-50 and acrylic acid were measured with liquid chromatography (LC) to determine reaction rate, to find that reaction rate of IPN-50 was 91.3% and reaction rate of acrylic acid was 98.9%.

Example 2

Into a glass-made reactor equipped with a thermometer, a stirrer, a dropping apparatus, a nitrogen introducing tube and a reflux condenser, 25.48 parts of ion-exchange water and 49.37 parts of an IPN-50 monomer were charged. After nitrogen purging in the reactor with stirring and heating-up to 60° C. under nitrogen atmosphere, 3.00 parts of an aqueous 2% hydrogen peroxide solution was added thereto and 1.92 parts of an aqueous 80% acrylic acid (B1) solution was dropped over 1.5 hours. After completion of the dropping of the monomer (B1), 4.08 parts of an aqueous 80% of acrylic acid (B2) solution was further dropped over 1.5 hours. As soon as starting dropping of the monomer (B1), an aqueous solution containing 0.14 part of 3-mercaptopropionic acid, 0.08 part of L-ascorbic acid and 15.94 parts of ion-exchange water was dropped over 3.5 hours. Then, after a temperature of the solution was maintained at 60° C. for another 1 hour, the solution was cooled to complete the polymerization. Thereafter, the reaction solution was neutralized using an aqueous solution of sodium hydroxide to pH=7 at a temperature not higher than the polymerization temperature (30° C.), to obtain an aqueous solution of a polymer (P-2) having a weight average molecular weight of about 41,000. Reaction rate was determined by LC, and reaction rate of IPN-50 was found to be 89.8% and reaction rate of acrylic acid was 98.5%.

Example 3

Into a glass-made reactor equipped with a thermometer, a stirrer, a dropping apparatus, a nitrogen introducing tube and a reflux condenser, 25.48 parts of ion-exchanged water and 49.37 parts of an IPN-50 monomer were charged. After nitrogen purging in the reactor with stirring and heating up to 60° C. under nitrogen atmosphere, 3.00 parts of an aqueous 2% hydrogen peroxide solution was added thereto and 1.25 parts of an aqueous 80% acrylic acid (B1) solution was dropped over 1.5 hours. After completion of the dropping of the monomer (B1), 4.75 parts of an aqueous 80% acrylic acid (B2) solution was further dropped over 1.5 hours. As soon as starting dropping of the monomer (B1), an aqueous solution containing 0.14 part of 3-mercaptopropionic acid, 0.08 part of L-ascorbic acid and 15.94 parts of ion-exchanged water was dropped over 3.5 hours. Then, after a temperature of the solution was maintained at 60° C. for another 1 hour, the solution was cooled to complete the polymerization. Thereafter, the reaction solution was neutralized using an aqueous solution of sodium hydroxide to pH=7 at a temperature not higher than the polymerization temperature (30° C.), to obtain an aqueous solution of a polymer (P-3) having a weight average molecular weight of about 44,000. Reaction rate was determined by LC, and reaction rate of IPN-50 was found to be 87.9% and reaction rate of acrylic acid was 98.0%.

Comparative Example 1

Into a glass-made reactor equipped with a thermometer, a stirrer, a dropping apparatus, a nitrogen introducing tube and a reflux condenser, 25.48 parts of ion-exchanged water and 49.37 parts of an IPN-50 monomer were charged. After nitrogen purging in the reactor with stirring and heating up to 60° C. under nitrogen atmosphere, 3.00 parts of an aqueous 2% hydrogen peroxide solution was added thereto, and 6.00 parts of an aqueous 80% of acrylic acid (B) solution was dropped over 3 hours. As soon as starting dropping of the monomer (B), an aqueous solution containing 0.14 part of 3-mercaptopropionic acid, 0.08 part of L-ascorbic acid and 15.94 parts of ion-exchanged water was dropped over 3.5 hours. Then, after a temperature of the solution was maintained at 60° C. for another 1 hour, the solution was cooled to complete the polymerization. Thereafter, the reaction solution was neutralized using an aqueous solution of sodium hydroxide to pH=7 at a temperature not higher than the polymerization temperature (30° C.), to obtain an aqueous solution of a polymer (H-1) having a weight average molecular weight of about 43,000. Reaction rate was determined by LC, and reaction rate of IPN-50 was found to be 90.0% and reaction rate of acrylic acid was 98.6%.

Comparative Example 2

Into a glass-made reactor equipped with a thermometer, a stirrer, a dropping apparatus, a nitrogen introducing tube and a reflux condenser, 15.00 parts of ion-exchanged water was charged. After nitrogen purging in the reactor with stirring and heating up to 60° C. under nitrogen atmosphere, 3.00 parts of an aqueous 2% hydrogen peroxide solution was added thereto, and 6.00 parts of an aqueous 80% acrylic acid solution and 70.53 parts of an aqueous 70% IPN-50 solution were simultaneously dropped over 3 hours. As soon as starting dropping of these monomers, an aqueous solution containing 0.14 part of 3-mercaptopropionic acid, 0.08 part of L-ascorbic acid and 5.26 parts of ion-exchanged water was dropped over 3.5 hours. Then, after a temperature of the solution was maintained at 60° C. for another 1 hour, the solution was cooled to complete the polymerization. Thereafter, the reaction solution was neutralized using an aqueous solution of sodium hydroxide to pH=7 at a temperature not higher than the polymerization temperature (30° C.), to obtain an aqueous solution of a polymer (H-2) having a weight average molecular weight of about 39,000. Reaction rate was determined by LC, and reaction rate of IPN-50 was found to be 86.4% and reaction rate of acrylic acid was 98.6%.

In the case of polymerization by simultaneously dropping the monomer (A) (IPN-50) and the monomer (B) (acrylic acid), comparing with a method for polymerization by dropping the monomer (B) into the monomer (A) added into a reactor in advance, a case that polymerization concentration can not be raised may happen due to a problem on reactor (because of small amount of an initial charge, stirring blades are not dipped and monomers can not be sufficiently stirred in the first half of polymerization).

Results of Examples 1 to 3 and Comparative Examples 1 to 2 are summarized in Table 2 below. In Table 2 below, "rate of change" represents a ratio of addition rates of the monomer (B) before and after the variation, and is a value rounded off at two places of decimals to the nearest number. Also "molecular weight" represents a weight average molecular weight of a polymer produced.

TABLE 2

| Polymer | Addition amount of acrylic acid (% by weight)* | | Rate of change | Molecular weight | Reaction rate (%) | |
|---|---|---|---|---|---|---|
| | 0–1.5 hr | 1.5–3 hr | | | IPN-50 | Acrylic acid |
| P-1 | 6.03 | 2.84 | 2.1 | 42,000 | 91.3 | 98.9 |
| P-2 | 2.84 | 6.03 | 2.1 | 41,000 | 89.8 | 98.5 |
| P-3 | 1.85 | 7.01 | 3.8 | 44,000 | 87.9 | 98.0 |
| H-1 | 4.43 | 4.43 | 1.0 | 43,000 | 90.0 | 98.6 |
| H-2 | 4.43 | 4.43 | 1.0 | 39,000 | 86.4 | 98.6 |

*represents an addition amount of acrylic acid based on the total monomers (total amount of IPN-50 and acrylic acid)

From the results shown in Table 2, by comparing with the results of Examples 1 to 3, it is found that when polymerization is carried out by using IPN-50, an unsaturated polyalkylene glycol ether-based monomer, as the monomer (A), and dropping IPN-50 (the monomer (A)) and acrylic acid (the monomer (B)) simultaneously, reaction rate of IPN-50 is lowered and polymerization does not proceed efficiently.

Example 4

Mortar Test

Using an aqueous solution of a polycarboxylic acid-based copolymer (Y) as a standard substance, an aqueous solutions of copolymers (P-1 to P-3) produced similarly as in Examples 1 to 3, and an aqueous solution of the polymer (H-1) produced similarly as in Comparative Example 1, mortar flow values were measured in accordance with the mortar test method (X) for comparison. The results are shown in Table 3 below and in FIG. 1.

The addition amount of each copolymer for a cement admixture in Table 3 represents weight percent of solid content [nonvolatile matters] based on cement. The solid content [nonvolatile matters] was measured by heating and drying a suitable amount of an aqueous solution of a copolymer for a cement admixture at 130° C. for 1 hour under nitrogen atmosphere to remove volatile matters. Then the aqueous solution of the cement admixture was weighed and used so that a specified amount of solid content [nonvolatile matters] is contained in formulating with cement. "Ratio of addition amount (relative to Y)" in Table 3 means percentage (%) of the addition amount of a cement admixture, as reduced to solid content, necessary to obtain a flow value of 250±5 mm, in the mortar test method (X), relative to the addition amount of a polycarboxylic acid-based copolymer (Y), reduced to solid content, and "Y" means a polycarboxylic acid-based copolymer (Y).

TABLE 3

| Polymer | Addition amount of copolymer * | Ratio of addition amount (relative to Y) (%) | Flow value (mm) | | | | Air amount (% by vol) |
|---|---|---|---|---|---|---|---|
| | | | Initial | After 30 min. | After 60 min. | After 90 min. | |
| P-1 | 0.135 | 90.0 | 253 | 236 | 203 | 167 | 2.5 |
| P-2 | 0.150 | 100.0 | 246 | 237 | 220 | 199 | 2.4 |
| P-3 | 0.155 | 100.3 | 252 | 236 | 220 | 195 | 2.3 |
| H-1 | 0.140 | 93.3 | 253 | 237 | 205 | 172 | 2.8 |
| Y | 0.150 | — | 247 | — | — | — | 2.3 |

* represents % by weight of solid content based on cement.

From the results of Table 3, it is found that the copolymer P-1 which was obtained by a method for making the addition rate of the monomer (B) to the monomer (A) slower at the later stage requires smaller addition amount and shows superior water reducing performance, as compared with the polymer H-1 which was obtained by adding the monomer (B) to the monomer (A) at a constant rate, or a polycarboxylic acid-based copolymer (Y) exhibiting superior water reducing performance. Further, from the results of Table 3, it is also found that the copolymers P-2 and P-3 which were obtained by a method of making the addition rate of the monomer (B) to the monomer (A) faster at the later stage are superior in slump retention ability.

Example 5

Concrete Test

Figure 2:
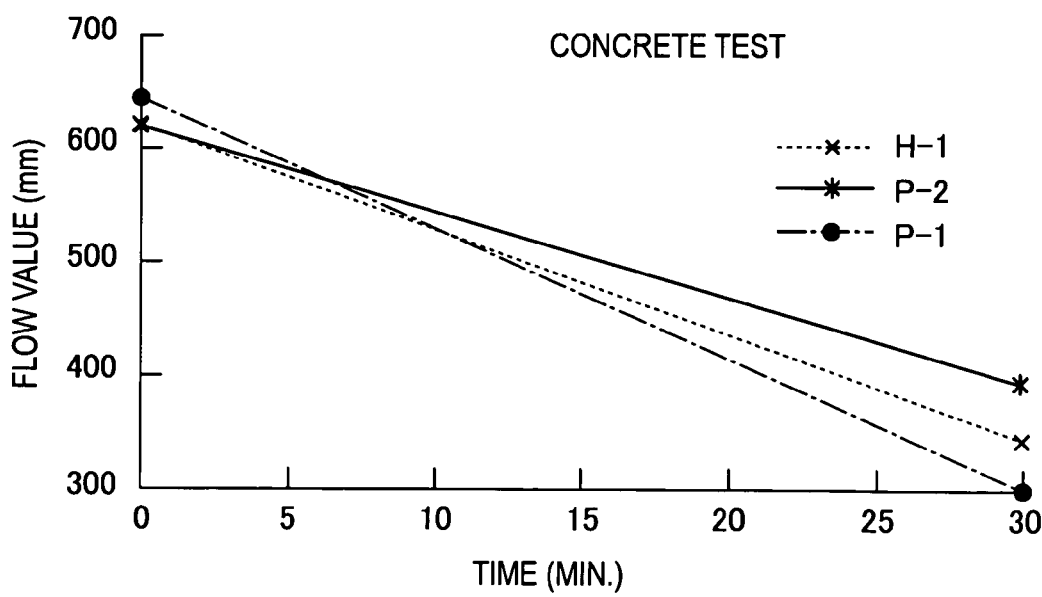
FIG. 2 is a graph showing flow values measured in the concrete test in Example 5, using copolymers P-1 and P-2 according to the present invention and a copolymer for comparison H-1.

Using aqueous solutions of the polymers (P-1 and P-2) according to the present invention produced similarly as in Examples 1 and 2, and an aqueous solution of the polymer (H-1) produced similarly as in Comparative Example 1, as a cement admixture, a concrete test was carried out and evaluated for their performances. Namely, aqueous solutions of the polymers (P-1 and P-2) according to the present invention and an aqueous solution of the polymer (H-1) of Comparative Example 1 were separately mixed for 2 minutes with a forced pan type mixer (50 L), to prepare concrete compositions of the following formulations for the measurement of flow values and air amounts. Flow value and air amount were measured in accordance with Japanese Industrial Standards, JIS-A-1101 and 1128. Addition amounts of the copolymers for a cement admixture were so adjusted that initial flow values became 600 to 650 mm. Results of flow values are shown in Table 4 and FIG. 2, and results of air amounts are shown in Table 4, respectively.

The addition amount of each copolymer for a cement admixture in Table 4 represents % by weight of solid content [nonvolatile matter] relative to cement. The solid content [nonvolatile matters] was measured by heating and drying a suitable amount of an aqueous solution of a copolymer for a cement admixture at 130° C. for 1 hour under nitrogen atmosphere to remove volatile matters. Then the aqueous solution of the cement admixture was weighed and used so that a specified amount of solid content [nonvolatile matters] is contained in formulating with cement.

(Formulation of Concrete)

Tap water: 175 kg/m³
Cement: Ordinary Portland cement (a mixture of equivalent amount of three grades, each produced from Taiheiyo Cement Co., Ltd., Ube-Mitsubishi Cement Corp., and Sumitomo Osaka Cement Co., Ltd.) 583 kg/m³
Fine aggregate: 670 kg/m³
Coarse aggregate: 920 kg/m³
Water/cement ratio (ratio by weight): 0.30
Antifoaming agent (ratio by weight): Alkylalkylene oxide-base antifoaming agent of 10 ppm (relative to cement)

TABLE 4

| Polymer | Addition amount of copolymer * | Flow value (mm) | | Air amount (% by vol) | |
|---|---|---|---|---|---|
| | | Initial | After 30 min. | Initial | After 30 min. |
| P-1 | 0.131 | 635 | 305 | 1.8 | 1.8 |
| P-2 | 0.141 | 625 | 400 | 1.6 | 1.6 |
| H-1 | 0.138 | 625 | 335 | 1.8 | 1.8 |

* represents % by weight of solid content based on cement.

From Tables 3 and 4, it is found that the copolymers P-1 to P-3 according to the present invention obtained by adding IPN-50 into a reactor in advance and polymerizing while dropping rate of acrylic acid as the monomer (B) is changed show more superior water reducing performance and slump retention ability, as compared with the copolymer H-1 in Comparative Example 1 obtained by polymerizing while dropping rate of acrylic acid is kept constant. Specifically, in this composition, the polymer P-1 obtained by changing dropping rate of acrylic acid as the monomer (B) to slower rate stepwise shows an equivalent flow value even with a smaller addition amount, as compared with the cases using other copolymers. From these, it is considered that a cement admixture using such a copolymer is superior in water reducing performance. On the other hand, the polymers P-2 and P-3 obtained by changing dropping rate of acrylic acid as the monomer (B) to faster rate stepwise show a small degree of decrease in flow value after 30 minutes or later, suggesting that a cement admixture using such copolymers is superior in slump retention ability.

Example 6

Into a glass-made reactor equipped with a thermometer, a stirrer, a dropping apparatus, a nitrogen introducing tube and a reflux condenser, 80.0 parts of ion-exchanged water and 42.5 parts of an IPN-50 monomer were charged. After nitrogen purging in the reactor with stirring and heating up to 60° C. under nitrogen atmosphere, 3.5 parts of an aqueous 2% hydrogen peroxide solution was added thereto and a mixed liquid of 7.5 parts of acrylic acid containing 0.10% by weight of β-acryloxypropanic acid and 50.0 parts of ion-exchanged water was dropped over 3 hours. As soon as starting dropping of the mixed liquid, an aqueous solution composed of 0.15 part of 3-mercaptopropionic acid, 0.12 part of L-ascorbic acid and 50.0 parts of ion-exchanged water was dropped over 3.5 hours. Then, after a temperature of the solution was maintained at 60° C. for another 1 hour, the solution was cooled to complete the polymerization. After that, the reaction solution was neutralized using an aqueous solution of sodium hydroxide to pH=6.5 at a temperature not higher than the polymerization temperature (30° C.), to obtain an aqueous solution containing a polymer (IP-1) having a weight average molecular weight of about 35,000 with a solid content of 20% by weight.

Examples 7 to 8 and Comparative Example 3

By conducting similar procedures as in Example 6, except that raw materials having contents of β-acryloxypropanic acid (acrylic acid dimer) in acrylic acid as shown in Table 5 below were used, aqueous solutions of polymers (IP-2) and (IP-3) with a solid content of 20% by weight, respectively, together with an aqueous solution containing a polymer (CIP-2) as a control with a solid content of 20% by weight, were obtained.

Example 9

Mortar Test

Using the aqueous solutions of the polymers (IP-1 to IP-3) obtained in Examples 6 to 8 and the aqueous solution of the polymer (CIP-1) obtained in Comparative Example 3, mortar flow values were measured in accordance with the mortar test method (X) for comparison. The results are shown in Table 5 below.

TABLE 5

| | Polymer | Content of acrylic acid dimer in acrylic acid (% by weight) | Mortar flow value (mm) |
|---|---|---|---|
| Example 6 | IP-1 | 0.10 | 248 |
| Example 7 | IP-2 | 2.00 | 242 |
| Example 8 | IP-3 | 4.10 | 230 |
| Comparative Example 3 | CIP-1 | 5.80 | 210 |

From Table 5, it is found that when acrylic acid with a content of the acrylic acid dimer over the upper limit of the present invention, that is 5.0% by weight, is used as a raw material (Comparative Example 3), mortar flow value is significantly decreased and cement dispersing performance is lowered.

INDUSTRIAL APPLICABILITY

The copolymer for a cement admixture relevant to the present invention shows high flow value with a small addition amount, and, in particular, can provide a cement admixture having superior dispersing performance even in a region of high water reducing rate. In addition, since the cement composition formulated with the cement admixture of the present invention shows superior fluidity, drawback in construction can be improved.

In addition, since the copolymer for the cement admixture relevant to the present invention is superior in slump retention ability, work becomes easy in a site where the cement composition is used.

The entire disclosure of Japanese Patent Application Nos. 2005-036895 filed on Feb. 14, 2005 and 2005-373375 filed on Dec. 26, 2005 including specification, claims, drawings and summary are incorporated herein by reference in its entirety.

The invention claimed is:

1. A method for producing a copolymer for a cement admixture, which comprises a step of polymerizing monomer components comprising at least one unsaturated polyalkylene glycol ether-based monomer (A) represented by the following formula (1):

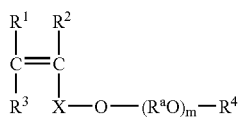

(1)

wherein $R^1$, $R^2$ and $R^3$ independently represent a hydrogen atom or a methyl group; $R^4$ represents a hydrogen atom or a hydrocarbon group with carbon atoms of 1 to 20; $R^a$ represents an alkylene group with carbon atoms of 2 to 18, provided that if m is 2 or more, each of oxyalkylene groups represented by $R^aO$ may be the same or different from each other; m represents an average addition mole number of oxyalkylene groups represented by $R^aO$ and is in the range of 1 to 300; and X represents a bivalent alkylene group with carbon atoms of 1 to 5, or when a group represented by $R^1R^3C=CR^2$ is a vinyl group, X represents a bond; and at least one unsaturated organic acid-based monomer (B) represented by the following formula (2):

(2)

wherein $R^7$, $R^8$ and $R^9$ independently represent a hydrogen atom, a methyl group or $-(CH_2)_zCOOM^2$, wherein $-(CH_2)_zCOOM^2$ may form an anhydride together with $-COOM^1$ or another $-(CH_2)_zCOOM^2$, in which case $M^1$ or $M^2$ is not present, and z is in the range of 0 to 2; and $M^1$ and $M^2$ independently represent a hydrogen atom, a metal atom, an ammonium group or an organic amine group;

wherein the unsaturated polyalkylene glycol ether-based monomer (A) is added into a reactor in advance and the unsaturated organic acid-based monomer (B) is added thereto continuously or stepwise with a decreasing or increasing addition rate, and when the addition rate of the unsaturated organic acid-based monomer (B) is changed continuously, the ratio of the maximum addition rate ($V_{MAX}$) and the minimum addition rate ($V_{MIN}$) is not less than 1.2 times, and, when the addition rate of the unsaturated organic acid-based monomer (B) is changed stepwise, the ratio of the addition rates of the unsaturated organic acid-based monomer (B) before and after each change is not less than 1.2 times.

2. A method according to claim 1, wherein the addition rate of the unsaturated organic acid-based monomer (B) is changed stepwise.

3. A method according to claim 1, wherein the unsaturated organic acid-based monomer (B) contains a (meth)acrylic acid-based monomer.

4. A method according to claim 2, wherein the unsaturated organic acid-based monomer (B) contains a (meth)acrylic acid-based monomer.

* * * * *